(12) United States Patent
Zhang

(10) Patent No.: US 10,051,198 B2
(45) Date of Patent: Aug. 14, 2018

(54) METHOD FOR CREATING A HIGH DYNAMIC RANGE IMAGE USING THREE GROUPS OF EXPOSURE BRIGHTNESS ADJUSTED IMAGES

(71) Applicant: Huawei Technologies Co., Ltd., Shenzhen (CN)

(72) Inventor: Zhen Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/554,509

(22) PCT Filed: Aug. 31, 2015

(86) PCT No.: PCT/CN2015/088639
§ 371 (c)(1),
(2) Date: Aug. 30, 2017

(87) PCT Pub. No.: WO2017/035750
PCT Pub. Date: Mar. 9, 2017

(65) Prior Publication Data
US 2018/0041682 A1 Feb. 8, 2018

(51) Int. Cl.
*H04N 5/235* (2006.01)
(52) U.S. Cl.
CPC ................. *H04N 5/2355* (2013.01)

(58) Field of Classification Search
CPC ...................................................... H04N 5/2355
See application file for complete search history.

(56) References Cited

U.S. PATENT DOCUMENTS

| 2010/0259636 A1 | 10/2010 | Tzur et al. |
| 2011/0096085 A1 | 4/2011 | Cha et al. |
| 2011/0149095 A1 | 6/2011 | Kikuchi |
| 2013/0124471 A1* | 5/2013 | Chen ................. H04N 5/23238 707/624 |
| 2014/0098254 A1 | 4/2014 | Conard |
| 2015/0109303 A1 | 4/2015 | Boyadzhiev et al. |
| 2017/0083767 A1* | 3/2017 | Qian ................. G06K 9/00624 |

FOREIGN PATENT DOCUMENTS

| CN | 101494739 A | 7/2009 |
| CN | 102265320 A | 11/2011 |
| EP | 1986422 A1 | 10/2008 |
| EP | 2763396 A1 | 8/2014 |

* cited by examiner

*Primary Examiner* — Gary C Vieaux
(74) *Attorney, Agent, or Firm* — Slater Matsil, LLP

(57) ABSTRACT

A method and an apparatus for capturing an image are disclosed. In this embodiment, after an exposure brightness adjustment multiple group is determined, the exposure brightness adjustment multiple group is adjusted according to a current exposure proportion. In this way, exposure brightness adjustment multiple groups that are used for capturing images are also different.

20 Claims, 4 Drawing Sheets

METHOD FOR CREATING A HIGH DYNAMIC RANGE IMAGE USING THREE GROUPS OF EXPOSURE BRIGHTNESS ADJUSTED IMAGES

CROSS-REFERENCE TO RELATED APPLICATIONS

This application is a national stage of International Application No. PCT/CN2015/088639, filed on Aug. 31, 2015, which is hereby incorporated by reference in its entirety.

TECHNICAL FIELD

The present invention relates to the field of image capturing, and in particular, to a method and an apparatus for capturing an image.

BACKGROUND

An HDR (High Dynamic Range) technology is developed in a conventional film age. By partially increasing or decreasing brightness, hierarchies of a bright part and a dark part of a photo. As long as a terminal device captures images whose compositions are the same and exposures are different, a high dynamic range image may be composited.

With increasing requirements of users on images, some terminal devices also use the HDR technology to capture images. The terminal device obtains, through capturing, images of different exposures by setting exposures of different levels, then analyses multiple frames of images by using an HDR composite algorithm, and extracts some details of different images to perform composition, so as to composite several low dynamic range images to a higher dynamic range image.

However, currently, it is relatively simple for the terminal device to select exposures of different levels, and cannot satisfy special requirements of some scenarios. In some scenarios, after HDR processing is performed on a captured image, an abnormal artificial effect may occur. Consequently, image quality is relatively poor.

For example, an existing terminal device mainly counts overexposed and underexposed cases in a scenario, and designs, by experience, a group or multiple groups of exposures of fixed levels, to capture images of different exposures. Limited exposures of several levels cannot achieve an expected effect. For example, for an overexposed scenario, EV (Exposure Value) values of three images are respectively (1, 0, −1.5). For an underexposed scenario, EV values of three images are respectively (+1.5, 0, −1). However, quality of an image obtained in this manner is relatively poor.

SUMMARY

Embodiments of the present invention provide a method for capturing an image, to improve quality of a captured image.

According to a first aspect, a method for capturing an image is provided, including determining, by user equipment, a first exposure proportion of a current preview image of a to-be-captured area. The method also includes determining, by the user equipment, a corresponding exposure brightness adjustment multiple group according to the first exposure proportion, where the exposure brightness adjustment multiple group includes three types of exposure brightness adjustment multiples, a first type of an exposure brightness adjustment multiple is used to indicate that exposure brightness is increased after the exposure brightness is adjusted by using the exposure brightness adjustment multiple, a second type of an exposure brightness adjustment multiple is used to indicate that exposure brightness remains unchanged after the exposure brightness is adjusted by using the exposure brightness adjustment multiple, and a third type of an exposure brightness adjustment multiple is used to indicate that exposure brightness is decreased after the exposure brightness is adjusted by using the exposure brightness adjustment multiple. Additionally, the method includes adjusting, by the user equipment, the first type of the exposure brightness adjustment multiple and the third type of the exposure brightness adjustment multiple according to the first exposure proportion. Also, the method includes capturing, by the user equipment, a first group of images of the to-be-captured area by using an adjusted first type of the exposure brightness adjustment multiple, a second group of images of the to-be-captured area by using the second type of the exposure brightness adjustment multiple, and a third group of images of the to-be-captured area by using an adjusted third type of the exposure brightness adjustment multiple. The method also includes compositing, by the user equipment, a target image according to the first group of images, the second group of images, and the third group of images.

With reference to the first aspect, in a first possible implementation manner, the first exposure proportion includes a first overexposed proportion and/or a first underexposed proportion.

With reference to the first possible implementation manner of the first aspect, in a second possible implementation manner, the determining, by the user equipment, a corresponding exposure brightness adjustment multiple group according to the first exposure proportion includes: determining, by the user equipment, a brightness value of the preview image; decreasing, by the user equipment, the brightness value when determining that the first overexposed proportion reaches a first overexposed proportion threshold and the first underexposed proportion does not reach a first underexposed proportion threshold; determining, by the user equipment, a second overexposed proportion and a second underexposed proportion of the preview image, and a first variation of the brightness value after the brightness value is decreased, when determining that a first pre-set condition is satisfied after the brightness value is decreased; and determining, by the user equipment, an exposure brightness adjustment multiple group corresponding to the second overexposed proportion when determining that the second overexposed proportion reaches the second overexposed proportion threshold and the second underexposed proportion does not reach a third underexposed proportion threshold.

With reference to the first possible implementation manner of the first aspect, in a third possible implementation manner, the determining, by the user equipment, a corresponding exposure brightness adjustment multiple group according to the first exposure proportion includes: determining, by the user equipment, a brightness value of the preview image; decreasing, by the user equipment, the brightness value when determining that the first overexposed proportion reaches a first overexposed proportion threshold and the first underexposed proportion does not reach a first underexposed proportion threshold; determining, by the user equipment, a second overexposed proportion and a second underexposed proportion of the preview image, and a first variation of the brightness value after the brightness value is decreased, when determining that a first pre-set condition is satisfied after the brightness value is decreased; and determining, by the user equipment, an exposure brightness adjustment multiple group corresponding to the second underexposed proportion when determining that the second underexposed proportion reaches the third underexposed proportion threshold and the second overexposed proportion does not reach the second overexposed proportion threshold.

With reference to the first possible implementation manner of the first aspect, in a fourth possible implementation manner, the determining, by the user equipment, a corresponding exposure brightness adjustment multiple group according to the first exposure proportion includes: determining, by the user equipment, a brightness value of the preview image; decreasing, by the user equipment, the brightness value when determining that the first overexposed proportion reaches a first overexposed proportion threshold and the first underexposed proportion does not reach a first underexposed proportion threshold; determining, by the user equipment, a second overexposed proportion and a second underexposed proportion of the preview image, and a first variation of the brightness value after the brightness value is decreased, when determining that a first pre-set condition is satisfied after the brightness value is decreased; and determining, by the user equipment, an exposure brightness adjustment multiple group corresponding to the second underexposed proportion and the second overexposed proportion when determining that the second underexposed proportion reaches the third underexposed proportion threshold and the second overexposed proportion reaches the second overexposed proportion threshold.

With reference to the second to the fourth possible implementation manners of the first aspect, in a fifth possible implementation manner, the adjusting, by the user equipment, the first type of the exposure brightness adjustment multiple and the third type of the exposure brightness adjustment multiple according to the first exposure proportion includes: adjusting, by the user equipment, the first type of the exposure brightness adjustment multiple according to the first underexposed proportion, the second underexposed proportion, and the first variation; and adjusting, by the user equipment, the third type of the exposure brightness adjustment multiple according to the first overexposed proportion and the second overexposed proportion.

With reference to the second to the fifth possible implementation manners of the first aspect, in a sixth possible implementation manner, the first pre-set condition is that: the first variation reaches a first variation threshold, and/or the second underexposed proportion reaches the first underexposed proportion threshold.

With reference to the second to the sixth possible implementation manners of the first aspect, in a seventh possible implementation manner, the method further includes: returning, by the user equipment, to a step of determining that the second overexposed proportion reaches the first overexposed proportion threshold until the first pre-set condition is satisfied, when determining that the first pre-set condition is not satisfied after the brightness value is decreased, where the step includes the following operation: decreasing, by the user equipment, the brightness value when determining that a current overexposed proportion after the brightness value is decreased reaches the first overexposed proportion threshold and a current underexposed proportion after the brightness value is decreased does not reach the first underexposed proportion threshold.

With reference to the second to the seventh possible implementation manners of the first aspect, in an eighth possible implementation manner, before the determining, by the user equipment, a second overexposed proportion, a second underexposed proportion, and a first variation after determining that a first pre-set condition is satisfied after the brightness value is decreased, the method further includes: determining, by the user equipment, that the second overexposed proportion reaches the second overexposed proportion threshold; or determining, by the user equipment, that the second underexposed proportion reaches the third underexposed proportion threshold.

With reference to the first possible implementation manner of the first aspect, in a ninth possible implementation manner, the determining, by the user equipment, a corresponding exposure brightness adjustment multiple group according to the first exposure proportion includes: determining, by the user equipment, a brightness value; increasing, by the user equipment, the brightness value when determining that the first underexposed proportion reaches a second underexposed proportion threshold and the first overexposed proportion does not reach a third overexposed proportion threshold; determining, by the user equipment, a third overexposed proportion, a third underexposed proportion, and a second variation of the brightness value after the brightness value is increased, when determining that a second pre-set condition is satisfied after the brightness value is increased; and determining, by the user equipment, an exposure brightness adjustment multiple group corresponding to the third overexposed proportion when determining that the third overexposed proportion reaches the second overexposed proportion threshold and the third underexposed proportion does not reach a third underexposed proportion threshold.

With reference to the first possible implementation manner of the first aspect, in a tenth possible implementation manner, the determining, by the user equipment, a corresponding exposure brightness adjustment multiple group according to the first exposure proportion includes: determining, by the user equipment, a brightness value; increasing, by the user equipment, the brightness value when determining that the first underexposed proportion reaches a second underexposed proportion threshold and the first overexposed proportion does not reach a third overexposed proportion threshold; determining, by the user equipment, a third overexposed proportion, a third underexposed proportion, and a second variation of the brightness value after the brightness value is increased, when determining that a second pre-set condition is satisfied after the brightness value is increased; and determining, by the user equipment, an exposure brightness adjustment multiple group corresponding to the third underexposed proportion when determining that the third underexposed proportion reaches the third underexposed proportion threshold and the third overexposed proportion does not reach the second overexposed proportion threshold.

With reference to the first possible implementation manner of the first aspect, in an eleventh possible implementation manner, the determining, by the user equipment, a corresponding exposure brightness adjustment multiple group according to the first exposure proportion includes: determining, by the user equipment, a brightness value; increasing, by the user equipment, the brightness value when determining that the first underexposed proportion reaches a second underexposed proportion threshold and the first overexposed proportion does not reach a third overexposed proportion threshold; determining, by the user equipment, a third overexposed proportion, a third underexposed proportion, and a second variation of the brightness value after the brightness value is increased, when determining that a second pre-set condition is satisfied after the brightness value is increased; and determining, by the user equipment, an exposure brightness adjustment multiple group corresponding to the third overexposed proportion and the third underexposed proportion when determining that the third underexposed proportion reaches the third underexposed proportion threshold and the third overexposed proportion reaches the second overexposed proportion threshold.

With reference to the ninth to the eleventh possible implementation manners of the first aspect, in a twelfth possible implementation manner, the adjusting, by the user equipment, the first type of the exposure brightness adjustment multiple and the third type of the exposure brightness adjustment multiple according to the first exposure proportion includes: adjusting, by the user equipment, the first type of the exposure brightness adjustment multiple according to the first underexposed proportion and the third underexposed proportion; and adjusting, by the user equipment, the third type of the exposure brightness adjustment multiple according to the first overexposed proportion, the third overexposed proportion, and the second variation.

With reference to the ninth to the twelfth possible implementation manners of the first aspect, in a thirteenth possible implementation manner, the second pre-set condition is that: the second variation reaches a second variation threshold and/or the third overexposed proportion reaches the third overexposed proportion threshold.

With reference to the ninth to the thirteenth possible implementation manners of the first aspect, in a fourteenth possible implementation manner, the method further includes: returning, by the user equipment, to a step of determining that the third underexposed proportion reaches the second underexposed proportion threshold until the second pre-set condition is satisfied, when determining that the second pre-set condition is not satisfied after the brightness value is increased, where the step includes the following operation: increasing, by the user equipment, the brightness value when determining that a current underexposed proportion after the brightness value is increased reaches the second underexposed proportion threshold and a current overexposed proportion after the brightness value is increased does not reach the third overexposed proportion threshold.

With reference to the ninth to the fourteenth possible implementation manners of the first aspect, in a fifteenth possible implementation manner, before the determining, by the user equipment, a third overexposed proportion, a third underexposed proportion, and a second variation after determining that a second pre-set condition is satisfied, the method further includes: determining, by the user equipment, that the third underexposed proportion reaches the third underexposed proportion threshold; or determining, by the user equipment, that the third overexposed proportion reaches the second overexposed proportion threshold.

With reference to the first possible implementation manner of the first aspect, in a sixteenth possible implementation manner, the adjusting, by the user equipment, the third type of the exposure brightness adjustment multiple according to the first exposure proportion includes: determining, by the user equipment, a brightness value of the preview image; decreasing, by the user equipment, the brightness value, and calculating a third variation of the brightness value when determining that the first overexposed proportion reaches a second overexposed proportion threshold; determining, by the user equipment, a fourth overexposed proportion after the brightness value of the preview image is decreased; and adjusting, by the user equipment, the third type of the exposure brightness adjustment multiple according to the third variation when determining that the fourth overexposed proportion does not reach a fourth overexposed proportion threshold.

With reference to the first or the sixteenth possible implementation manner of the first aspect, in a seventeenth possible implementation manner, the adjusting, by the user equipment, the first type of the exposure brightness adjustment multiple according to the first exposure proportion includes: determining, by the user equipment, a brightness value of the preview image; increasing, by the user equipment, the brightness value, and calculating a fourth variation of the brightness value when determining that the first underexposed proportion reaches a third underexposed proportion threshold; determining, by the user equipment, a fourth underexposed proportion of the preview image after the brightness value is increased; and adjusting, by the user equipment, the first type of the exposure brightness adjustment multiple according to the fourth variation when determining that the fourth underexposed proportion does not reach the fourth underexposed proportion threshold.

With reference to the first to the seventeenth possible implementation manners of the first aspect, in an eighteenth possible implementation manner, after the adjusting, by the user equipment, the first type of the exposure brightness adjustment multiple and the third type of the exposure brightness adjustment multiple according to the first exposure proportion, and before the capturing a first group of images, a second group of images, and a third group of images, the method further includes: determining, by the user equipment, a second exposure proportion of a region of interest ROI of the preview image and a weight value of the ROI; calculating, by the user equipment, a third exposure proportion according to the second exposure proportion and the weight value; and adjusting, by the user equipment, the adjusted first type of the exposure brightness adjustment multiple and the adjusted third type of the exposure brightness adjustment multiple again according to the third exposure proportion.

With reference to the first aspect and the first to the eighteenth possible implementation manners of the first aspect, in a nineteenth possible implementation manner, before the determining, by user equipment, a first exposure proportion of a current preview image of a to-be-captured area, the method further includes: increasing, by the user equipment, the brightness value of the preview image and determining a fifth variation after the brightness value is increased; and determining, by the user equipment, a fourth exposure proportion before the brightness value of the preview image is increased; and the determining, by user equipment, a first exposure proportion of a current preview image of a to-be-captured area includes: determining, by the user equipment, the first exposure proportion after the brightness value of the current preview image is increased.

With reference to the nineteenth possible implementation manner of the first aspect, in a twentieth possible implementation manner, the adjusting, by the user equipment, the first type of the exposure brightness adjustment multiple and the third type of the exposure brightness adjustment multiple according to the first exposure proportion includes: adjusting, by the user equipment, the first type of the exposure brightness adjustment multiple and the third type of the exposure brightness adjustment multiple according to the first exposure proportion, the fourth exposure proportion, and the fifth variation.

With reference to the nineteenth or the twentieth possible implementation manner of the first aspect, in a twenty-first possible implementation manner, the first exposure proportion includes the first overexposed proportion and/or the first underexposed proportion, and the fourth exposure proportion includes a fifth overexposed proportion and/or a fifth underexposed proportion; and the adjusting, by the user equipment, the first type of the exposure brightness adjustment multiple and the third type of the exposure brightness adjustment multiple according to the first exposure proportion, the fourth exposure proportion, and the fifth variation includes: adjusting, by the user equipment, the first type of the exposure brightness adjustment multiple according to the first underexposed proportion and the fifth underexposed proportion; and adjusting, by the user equipment, the third type of the exposure brightness adjustment multiple according to the first overexposed proportion, the fifth overexposed proportion, and the fifth variation.

With reference to the first aspect and the first to the twenty-first possible implementation manners of the first aspect, in a twenty-second possible implementation manner, before the determining, by user equipment, a first exposure proportion of a current preview image of a to-be-captured area, the method further includes: decreasing, by the user equipment, the brightness value of the preview image and determining a sixth variation after the brightness value is decreased; and determining, by the user equipment, a fifth exposure proportion before the brightness value of the preview image is decreased; and the determining, by user equipment, a first exposure proportion of a current preview image of a to-be-captured area includes: determining, by the user equipment, the first exposure proportion after the brightness value of the current preview image is decreased.

With reference to the twenty-second possible implementation manner of the first aspect, in a twenty-third possible implementation manner, the adjusting, by the user equipment, the first type of the exposure brightness adjustment multiple and the third type of the exposure brightness adjustment multiple according to the first exposure proportion includes: adjusting, by the user equipment, the first type of the exposure brightness adjustment multiple and the third type of the exposure brightness adjustment multiple according to the first exposure proportion, the fifth exposure proportion, and the sixth variation.

With reference to the twenty-second or the twenty-third possible implementation manner of the first aspect, in a twenty-fourth possible implementation manner, the first exposure proportion includes the first overexposed proportion and/or the first underexposed proportion, and the fifth exposure proportion includes a sixth overexposed proportion and/or a sixth underexposed proportion; and the adjusting, by the user equipment, the first type of the exposure brightness adjustment multiple and the third type of the exposure brightness adjustment multiple according to the first exposure proportion, the fifth exposure proportion, and the sixth variation includes: adjusting, by the user equipment, the first type of the exposure brightness adjustment multiple according to the first underexposed proportion, the sixth underexposed proportion, and the sixth variation; and adjusting, by the user equipment, the third type of the exposure brightness adjustment multiple according to the first overexposed proportion and the sixth overexposed proportion.

With reference to the nineteenth to the twenty-fourth possible implementation manners of the first aspect, in a twenty-fifth possible implementation manner, the compositing, by the user equipment, a target image according to the first group of images, the second group of images, and the third group of images includes: increasing, by the user equipment, a composite weight of a target area of the second group of images; and compositing, by the user equipment, the target image according to the first group of images, the second group of images, an increased composite weight of the second group of images, and the third group of images.

According to a second aspect, a method for capturing an image is provided, including detecting, by user equipment when determining that there is a moving object, a motion intensity of the moving object. The method also includes using, by the user equipment, an image whose exposure brightness adjustment multiple is 0 as a target image when determining that the motion intensity is greater than a motion intensity threshold.

With reference to the second aspect, in a first possible implementation manner, when determining that there is no moving object, the user equipment composites the target image by using a long exposure time; and when determining that the motion intensity is less than or equal to the motion intensity threshold, the user equipment composites the target image by using a short exposure time.

With reference to the first possible implementation manner of the second aspect, in a second possible implementation manner, the determining, by user equipment, that there is a moving object includes: determining, by the user equipment, that the user equipment is in a moving state, and/or that there is an object in a moving state in a to-be-captured area.

According to a third aspect, a method for capturing an image is provided, including: determining, by user equipment when determining that banding exists in a current preview image of a to-be-captured area, an intensity of the banding; increasing, by the user equipment, a first type of an exposure brightness adjustment multiple and a second type of an exposure brightness adjustment multiple when determining that the intensity of the banding is greater than an intensity threshold, where the first type of the exposure brightness adjustment multiple is used to indicate that exposure brightness remains unchanged after the exposure brightness is adjusted by using the exposure brightness adjustment multiple, and the second type of the exposure brightness adjustment multiple is used to indicate that exposure brightness is decreased after the exposure brightness is adjusted by using the exposure brightness adjustment multiple; capturing, by the user equipment, a first group of images of the to-be-captured area according to an adjusted first type of the exposure brightness adjustment multiple, a second group of images of the to-be-captured area according to an adjusted second type of the exposure brightness adjustment multiple, and a third group of images of the to-be-captured area according to a third type of an exposure brightness adjustment multiple, where the second type of the exposure brightness adjustment multiple is used to indicate that exposure brightness is increased after the exposure brightness is adjusted by using the exposure brightness adjustment multiple; and compositing, by the user equipment, a target image according to the first group of images, the second group of images, and the third group of images.

With reference to the third aspect, in a first possible implementation manner, after the determining, by the user equipment, that the intensity of the banding is greater than an intensity threshold, and before the capturing a third group of images of the to-be-captured area according to a third type of an exposure brightness adjustment multiple, the method further includes: adjusting, by the user equipment, the third type of the exposure brightness adjustment multiple; and the capturing, by the user equipment, a third group of images of the to-be-captured area according to a third type of an exposure brightness adjustment multiple includes: capturing, by the user equipment, the third group of images of the to-be-captured area according to an adjusted third type of the exposure brightness adjustment multiple.

With reference to the third aspect or the first possible implementation manner of the third aspect, in a second possible implementation manner, when determining that the intensity of the banding is less than or equal to the intensity threshold, the user equipment increases the second type of the exposure brightness adjustment multiple and/or decreases a weight value of the second group of images.

According to a fourth aspect, user equipment is provided, including: a determining unit, configured to determine a first exposure proportion of a current preview image of a to-be-captured area, where the determining unit is further configured to determine a corresponding exposure brightness adjustment multiple group according to the first exposure proportion, where the exposure brightness adjustment multiple group includes three types of exposure brightness adjustment multiples, a first type of an exposure brightness adjustment multiple is used to indicate that exposure brightness is increased after the exposure brightness is adjusted by using the exposure brightness adjustment multiple, a second type of an exposure brightness adjustment multiple is used to indicate that exposure brightness remains unchanged after the exposure brightness is adjusted by using the exposure brightness adjustment multiple, and a third type of an exposure brightness adjustment multiple is used to indicate that exposure brightness is decreased after the exposure brightness is adjusted by using the exposure brightness adjustment multiple; an adjustment unit, configured to adjust the first type of the exposure brightness adjustment multiple and the third type of the exposure brightness adjustment multiple according to the first exposure proportion; a capturing unit, configured to capture a first group of images of the to-be-captured area by using an adjusted first type of the exposure brightness adjustment multiple, a second group of images of the to-be-captured area by using the second type of the exposure brightness adjustment multiple, and a third group of images of the to-be-captured area by using an adjusted third type of the exposure brightness adjustment multiple; and a generation unit, configured to composite a target image according to the first group of images, the second group of images, and the third group of images.

With reference to the fourth aspect, in a first possible implementation manner, the first exposure proportion includes a first overexposed proportion and/or a first underexposed proportion.

With reference to the first possible implementation manner of the fourth aspect, in a second possible implementation manner, the determining, by the determining unit, a corresponding exposure brightness adjustment multiple group according to the first exposure proportion is specifically: determining a brightness value of the preview image; decreasing the brightness value when determining that the first overexposed proportion reaches a first overexposed proportion threshold and the first underexposed proportion does not reach a first underexposed proportion threshold; determining a second overexposed proportion and a second underexposed proportion of the preview image, and a first variation of the brightness value after the brightness value is decreased, when determining that a first pre-set condition is satisfied after the brightness value is decreased; and determining an exposure brightness adjustment multiple group corresponding to the second overexposed proportion when determining that the second overexposed proportion reaches the second overexposed proportion threshold and the second underexposed proportion does not reach a third underexposed proportion threshold.

With reference to the first possible implementation manner of the fourth aspect, in a third possible implementation manner, the determining, by the determining unit, a corresponding exposure brightness adjustment multiple group according to the first exposure proportion is specifically: determining a brightness value of the preview image; decreasing the brightness value when determining that the first overexposed proportion reaches a first overexposed proportion threshold and the first underexposed proportion does not reach a first underexposed proportion threshold; determining a second overexposed proportion and a second underexposed proportion of the preview image, and a first variation of the brightness value after the brightness value is decreased, when determining that a first pre-set condition is satisfied after the brightness value is decreased; and determining an exposure brightness adjustment multiple group corresponding to the second underexposed proportion when determining that the second underexposed proportion reaches the third underexposed proportion threshold and the second overexposed proportion does not reach the second overexposed proportion threshold.

With reference to the first possible implementation manner of the fourth aspect, in a fourth possible implementation manner, the determining, by the determining unit, a corresponding exposure brightness adjustment multiple group according to the first exposure proportion is specifically: determining a brightness value of the preview image; decreasing the brightness value when determining that the first overexposed proportion reaches a first overexposed proportion threshold and the first underexposed proportion does not reach a first underexposed proportion threshold; determining a second overexposed proportion and a second underexposed proportion of the preview image, and a first variation of the brightness value after the brightness value is decreased, when determining that a first pre-set condition is satisfied after the brightness value is decreased; and determining an exposure brightness adjustment multiple group corresponding to the second underexposed proportion and the second overexposed proportion when determining that the second underexposed proportion reaches the third underexposed proportion threshold and the second overexposed proportion reaches the second overexposed proportion threshold.

With reference to the second to the fourth possible implementation manners of the fourth aspect, in a fifth possible implementation manner, the adjusting, by an adjustment unit, the first type of the exposure brightness adjustment multiple and the third type of the exposure brightness adjustment multiple according to the first exposure proportion is specifically: adjusting the first type of the exposure brightness adjustment multiple according to the first underexposed proportion, the second underexposed proportion, and the first variation; and adjusting the third type of the exposure brightness adjustment multiple according to the first overexposed proportion and the second overexposed proportion.

With reference to the second to the fifth possible implementation manners of the fourth aspect, in a sixth possible implementation manner, the first pre-set condition is that: the first variation reaches a first variation threshold, and/or the second underexposed proportion reaches the first underexposed proportion threshold.

With reference to the second to the sixth possible implementation manners of the fourth aspect, in a seventh possible implementation manner, the determining unit is further configured to return to a step of determining that the second overexposed proportion reaches the first overexposed proportion threshold until the first pre-set condition is satisfied, when determining that the first pre-set condition is not satisfied after the brightness value is decreased, where the step includes the following operation: decreasing, by the user equipment, the brightness value when determining that a current overexposed proportion after the brightness value is decreased reaches the first overexposed proportion threshold and a current underexposed proportion after the brightness value is decreased does not reach the first underexposed proportion threshold.

With reference to the second to the seventh possible implementation manners of the fourth aspect, in an eighth possible implementation manner, before the determining, by the determining unit, a second overexposed proportion, a second underexposed proportion, and a first variation after determining that a first pre-set condition is satisfied after the brightness value is decreased, the user equipment further includes: determining that the second overexposed proportion reaches the second overexposed proportion threshold; or determining that the second underexposed proportion reaches the third underexposed proportion threshold.

With reference to the first possible implementation manner of the fourth aspect, in a ninth possible implementation manner, the determining, by the determining unit, a corresponding exposure brightness adjustment multiple group according to the first exposure proportion is specifically: determining a brightness value; increasing the brightness value when determining that the first underexposed proportion reaches a second underexposed proportion threshold and the first overexposed proportion does not reach a third overexposed proportion threshold; determining a third overexposed proportion, a third underexposed proportion, and a second variation of the brightness value after the brightness value is increased, when determining that a second pre-set condition is satisfied after the brightness value is increased; and determining an exposure brightness adjustment multiple group corresponding to the third overexposed proportion when determining that the third overexposed proportion reaches the second overexposed proportion threshold and the third underexposed proportion does not reach a third underexposed proportion threshold.

With reference to the first possible implementation manner of the fourth aspect, in a tenth possible implementation manner, the determining, by the determining unit, a corresponding exposure brightness adjustment multiple group according to the first exposure proportion is specifically: determining a brightness value; increasing the brightness value when determining that the first underexposed proportion reaches a second underexposed proportion threshold and the first overexposed proportion does not reach a third overexposed proportion threshold; determining a third overexposed proportion, a third underexposed proportion, and a second variation of the brightness value after the brightness value is increased, when determining that a second pre-set condition is satisfied after the brightness value is increased; and determining an exposure brightness adjustment multiple group corresponding to the third underexposed proportion when determining that the third underexposed proportion reaches the third underexposed proportion threshold and the third overexposed proportion does not reach the second overexposed proportion threshold.

With reference to the first possible implementation manner of the fourth aspect, in an eleventh possible implementation manner, the determining, by the determining unit, a corresponding exposure brightness adjustment multiple group according to the first exposure proportion is specifically: determining a brightness value; increasing the brightness value when determining that the first underexposed proportion reaches a second underexposed proportion threshold and the first overexposed proportion does not reach a third overexposed proportion threshold; determining a third overexposed proportion, a third underexposed proportion, and a second variation of the brightness value after the brightness value is increased, when determining that a second pre-set condition is satisfied after the brightness value is increased; and determining an exposure brightness adjustment multiple group corresponding to the third overexposed proportion and the third underexposed proportion when determining that the third underexposed proportion reaches the third underexposed proportion threshold and the third overexposed proportion reaches the second overexposed proportion threshold.

With reference to the ninth to the eleventh possible implementation manners of the fourth aspect, in a twelfth possible implementation manner, the adjusting, by the determining unit, the first type of the exposure brightness adjustment multiple and the third type of the exposure brightness adjustment multiple according to the first exposure proportion is specifically adjusting the first type of the exposure brightness adjustment multiple according to the first underexposed proportion and the third underexposed proportion; and adjusting the third type of the exposure brightness adjustment multiple according to the first overexposed proportion, the third overexposed proportion, and the second variation.

With reference to the ninth to the twelfth possible implementation manners of the fourth aspect, in a thirteenth possible implementation manner, the second pre-set condition is that: the second variation reaches a second variation threshold and/or the third overexposed proportion reaches the third overexposed proportion threshold.

With reference to the ninth to the thirteenth possible implementation manners of the fourth aspect, in a fourteenth possible implementation manner, the determining unit is further configured to return to a step of determining that the third underexposed proportion reaches the second underexposed proportion threshold until the second pre-set condition is satisfied, when determining that the second pre-set condition is not satisfied after the brightness value is increased, where the step includes the following operation: increasing, by the user equipment, the brightness value when determining that a current underexposed proportion after the brightness value is increased reaches the second underexposed proportion threshold and a current overexposed proportion after the brightness value is increased does not reach the third overexposed proportion threshold.

With reference to the ninth to the fourteenth possible implementation manners of the fourth aspect, in a fifteenth possible implementation manner, before the determining, by the determining unit, a third overexposed proportion, a third underexposed proportion, and a second variation after determining that a second pre-set condition is satisfied, the user equipment further includes: determining that the third underexposed proportion reaches the third underexposed proportion threshold; or determining that the third overexposed proportion reaches the second overexposed proportion threshold.

With reference to the first possible implementation manner of the fourth aspect, in a sixteenth possible implementation manner, the adjusting, by the determining unit, the third type of the exposure brightness adjustment multiple according to the first exposure proportion is specifically: determining a brightness value of the preview image; decreasing the brightness value, and calculating a third variation of the brightness value when determining that the first overexposed proportion reaches a second overexposed proportion threshold; determining a fourth overexposed proportion after the brightness value of the preview image is decreased; and adjusting the third type of the exposure brightness adjustment multiple according to the third variation when determining that the fourth overexposed proportion does not reach a fourth overexposed proportion threshold.

With reference to the first or the sixteenth possible implementation manner of the fourth aspect, in a seventeenth possible implementation manner, the adjusting, by an adjustment unit, the first type of the exposure brightness adjustment multiple according to the first exposure proportion is specifically: determining a brightness value of the preview image; increasing the brightness value, and calculating a fourth variation of the brightness value when determining that the first underexposed proportion reaches a third underexposed proportion threshold; determining a fourth underexposed proportion of the preview image after the brightness value is increased; and adjusting the first type of the exposure brightness adjustment multiple according to the fourth variation when determining that the fourth underexposed proportion does not reach the fourth underexposed proportion threshold.

With reference to the first to the seventeenth possible implementation manners of the fourth aspect, in an eighteenth possible implementation manner, the determining unit is further configured to: determine a second exposure proportion of a region of interest (ROI) of the preview image and a weight value of the ROI; and calculate a third exposure proportion according to the second exposure proportion and the weight value; and the adjustment unit is further configured to adjust the adjusted first type of the exposure brightness adjustment multiple and the adjusted third type of the exposure brightness adjustment multiple again according to the third exposure proportion.

With reference to the fourth aspect and the first to the eighteenth possible implementation manners of the fourth aspect, in a nineteenth possible implementation manner, the determining unit is further configured to: increase the brightness value of the preview image and determine a fifth variation after the brightness value is increased; and determine a fourth exposure proportion before the brightness value of the preview image is increased; and the determining, by a determining unit, a first exposure proportion of a current preview image of a to-be-captured area is specifically: determining the first exposure proportion after the brightness value of the current preview image is increased.

With reference to the nineteenth possible implementation manner of the fourth aspect, in a twentieth possible implementation manner, the adjusting, by an adjustment unit, the first type of the exposure brightness adjustment multiple and the third type of the exposure brightness adjustment multiple according to the first exposure proportion is specifically: adjusting the first type of the exposure brightness adjustment multiple and the third type of the exposure brightness adjustment multiple according to the first exposure proportion, the fourth exposure proportion, and the fifth variation.

With reference to the nineteenth or the twentieth possible implementation manner of the fourth aspect, in a twenty-first possible implementation manner, the first exposure proportion includes the first overexposed proportion and/or the first underexposed proportion, and the fourth exposure proportion includes a fifth overexposed proportion and/or a fifth underexposed proportion; and the adjusting, by the adjustment unit, the first type of the exposure brightness adjustment multiple and the third type of the exposure brightness adjustment multiple according to the first exposure proportion, the fourth exposure proportion, and the fifth variation is specifically: adjusting the first type of the exposure brightness adjustment multiple according to the first underexposed proportion and the fifth underexposed proportion; and adjusting the third type of the exposure brightness adjustment multiple according to the first overexposed proportion, the fifth overexposed proportion, and the fifth variation.

With reference to the fourth aspect and the first to the twenty-first possible implementation manners of the fourth aspect, in a twenty-second possible implementation manner, the determining unit is further configured to: decrease the brightness value of the preview image, and determine a sixth variation after the brightness value is decreased; and determine a fifth exposure proportion before the brightness value of the preview image is decreased; and the determining, by a determining unit, a first exposure proportion of a current preview image of a to-be-captured area is specifically: determining the first exposure proportion after the brightness value of the current preview image is decreased.

With reference to the twenty-second possible implementation manner of the fourth aspect, in a twenty-third possible implementation manner, the adjusting, by an adjustment unit, the first type of the exposure brightness adjustment multiple and the third type of the exposure brightness adjustment multiple according to the first exposure proportion is specifically adjusting the first type of the exposure brightness adjustment multiple and the third type of the exposure brightness adjustment multiple according to the first exposure proportion, the fifth exposure proportion, and the sixth variation.

With reference to the twenty-second or the twenty-third possible implementation manner of the fourth aspect, in a twenty-fourth possible implementation manner, the first exposure proportion includes the first overexposed proportion and/or the first underexposed proportion, and the fifth exposure proportion includes a sixth overexposed proportion and/or a sixth underexposed proportion; and the adjusting, by the adjustment unit, the first type of the exposure brightness adjustment multiple and the third type of the exposure brightness adjustment multiple according to the first exposure proportion, the fifth exposure proportion, and the sixth variation is specifically: adjusting the first type of the exposure brightness adjustment multiple according to the first underexposed proportion, the sixth underexposed proportion, and the sixth variation; and adjusting the third type of the exposure brightness adjustment multiple according to the first overexposed proportion and the sixth overexposed proportion.

With reference to the nineteenth to the twenty-fourth possible implementation manners of the fourth aspect, in a twenty-fifth possible implementation manner, the compositing, by a generation unit, a target image according to the first group of images, the second group of images, and the third group of images is specifically: increasing a composite weight of a target area of the second group of images; and compositing the target image according to the first group of images, the second group of images, an increased composite weight of the second group of images, and the third group of images.

According to a fifth aspect, user equipment is provided, including: a determining unit, configured to determine that there is a moving object; a detection unit, configured to: when the determining unit determines that there is a moving object, detect a motion intensity of the moving object, where the determining unit is further configured to determine that the motion intensity is greater than a motion intensity threshold; and a generation unit, configured to: when the determining unit determines that the motion intensity is greater than the motion intensity threshold, use an image whose exposure brightness adjustment multiple is 0 as a target image.

With reference to the fifth aspect, in a first possible implementation manner, the determining unit is further configured to determine that there is no moving object; the generation unit is further configured to: when the determining unit determines that there is no moving object, composite the target image by using a long exposure time; the determining unit is further configured to determine that the motion intensity is less than or equal to the motion intensity threshold; and the generation unit is further configured to: when the determining unit determines that the motion intensity is less than or equal to the motion intensity threshold, composite the target image by using a short exposure time.

With reference to the first possible implementation manner of the fifth aspect, in a second possible implementation manner, the determining, by a determining unit, that there is a moving object is specifically: determining that the user equipment is in a moving state, and/or that there is an object in a moving state in a to-be-captured area.

According to a sixth aspect, user equipment is provided, including: a determining unit, configured to: when determining that banding exists in a current preview image of a to-be-captured area, determine an intensity of the banding; an adjustment unit, configured to increase a first type of an exposure brightness adjustment multiple and a second type of an exposure brightness adjustment multiple when determining that the intensity of the banding is greater than an intensity threshold, where the first type of the exposure brightness adjustment multiple is used to indicate that exposure brightness remains unchanged after the exposure brightness is adjusted by using the exposure brightness adjustment multiple, and the second type of the exposure brightness adjustment multiple is used to indicate that exposure brightness is decreased after the exposure brightness is adjusted by using the exposure brightness adjustment multiple; a capturing unit, configured to capture a first group of images of the to-be-captured area according to an adjusted first type of the exposure brightness adjustment multiple, a second group of images of the to-be-captured area according to an adjusted second type of the exposure brightness adjustment multiple, and a third group of images of the to-be-captured area according to a third type of an exposure brightness adjustment multiple, where the second type of the exposure brightness adjustment multiple is used to indicate that exposure brightness is increased after the exposure brightness is adjusted by using the exposure brightness adjustment multiple; and a generation unit, configured to composite a target image according to the first group of images, the second group of images, and the third group of images.

With reference to the sixth aspect, in a first possible implementation manner, the adjustment unit is further configured to adjust the third type of the exposure brightness adjustment multiple; and the capturing, by a capturing unit, a third group of images of the to-be-captured area according to a third type of an exposure brightness adjustment multiple is specifically: capturing the third group of images of the to-be-captured area according to an adjusted third type of the exposure brightness adjustment multiple.

With reference to the first possible implementation manner of the sixth aspect, in a second possible implementation manner, the adjustment unit is further configured to: when determining that the intensity of the banding is less than or equal to the intensity threshold, increase the second type of the exposure brightness adjustment multiple, and/or decrease a weight value of the second group of images.

According to a seventh aspect, a portable electronic device is provided, including: a display, where the display includes a touch-sensitive surface and a display screen; one or more processors; a memory; and one or more programs, where the one or more programs are stored in the memory, and are configured to be executed by the one or more processors, and the one or more programs include instructions used to perform the method according to some embodiments.

According to an eighth aspect, a computer readable storage medium storing one or more programs is provided, where the one or more programs include instructions, and when the instructions are executed by a portable electronic device including a display and multiple application programs, the portable electronic device performs the method according to some embodiments, where the display includes a touch-sensitive surface and a display screen.

According to a fourth aspect, a portable electronic device is provided, including: a display, where the display includes a touch-sensitive surface and a display screen; one or more processors; a memory; and one or more programs, where the one or more programs are stored in the memory, and are configured to be executed by the one or more processors, and the one or more programs include instructions used to perform the method according to some embodiments.

According to a tenth aspect, a computer readable storage medium storing one or more programs is provided, where the one or more programs include instructions, and when the instructions are executed by a portable electronic device including a display and multiple application programs, the portable electronic device performs the method according to some embodiments, where the display includes a touch-sensitive surface and a display screen.

According to an eleventh aspect, a portable electronic device is provided, including: a display, where the display includes a touch-sensitive surface and a display screen; one or more processors; a memory; and one or more programs, where the one or more programs are stored in the memory, and are configured to be executed by the one or more processors, and the one or more programs include instructions used to perform the method according to some embodiments.

According to a twelfth aspect, a computer readable storage medium storing one or more programs is provided, where the one or more programs include instructions, and when the instructions are executed by a portable electronic device including a display and multiple application programs, the portable electronic device performs the method according to some embodiments, where the display includes a touch-sensitive surface and a display screen.

In the embodiments of the present invention, after an exposure brightness adjustment multiple group is determined, the exposure brightness adjustment multiple group needs to be adjusted according to a current exposure proportion. In this way, although a same exposure brightness adjustment multiple group is determined according to different exposure proportions, because the exposure brightness adjustment multiple group still needs to be adjusted again according to the exposure proportion, in a scenario of different exposure proportions, exposure brightness adjustment multiple groups that are finally used for capturing images are also different. That is, the exposure brightness adjustment multiple group varies with different application scenarios. Therefore, quality of a captured image is improved.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, preferred implementation manners of the present invention are described in detail with reference to the accompanying drawings. It should be understood that the preferred embodiments described herein are merely used to illustrate and explain the present invention, but are not intended to limit the present invention. In addition, the embodiments of the present application and features in the embodiments may be mutually combined in a case in which they do not conflict with each other.

Figure 1:
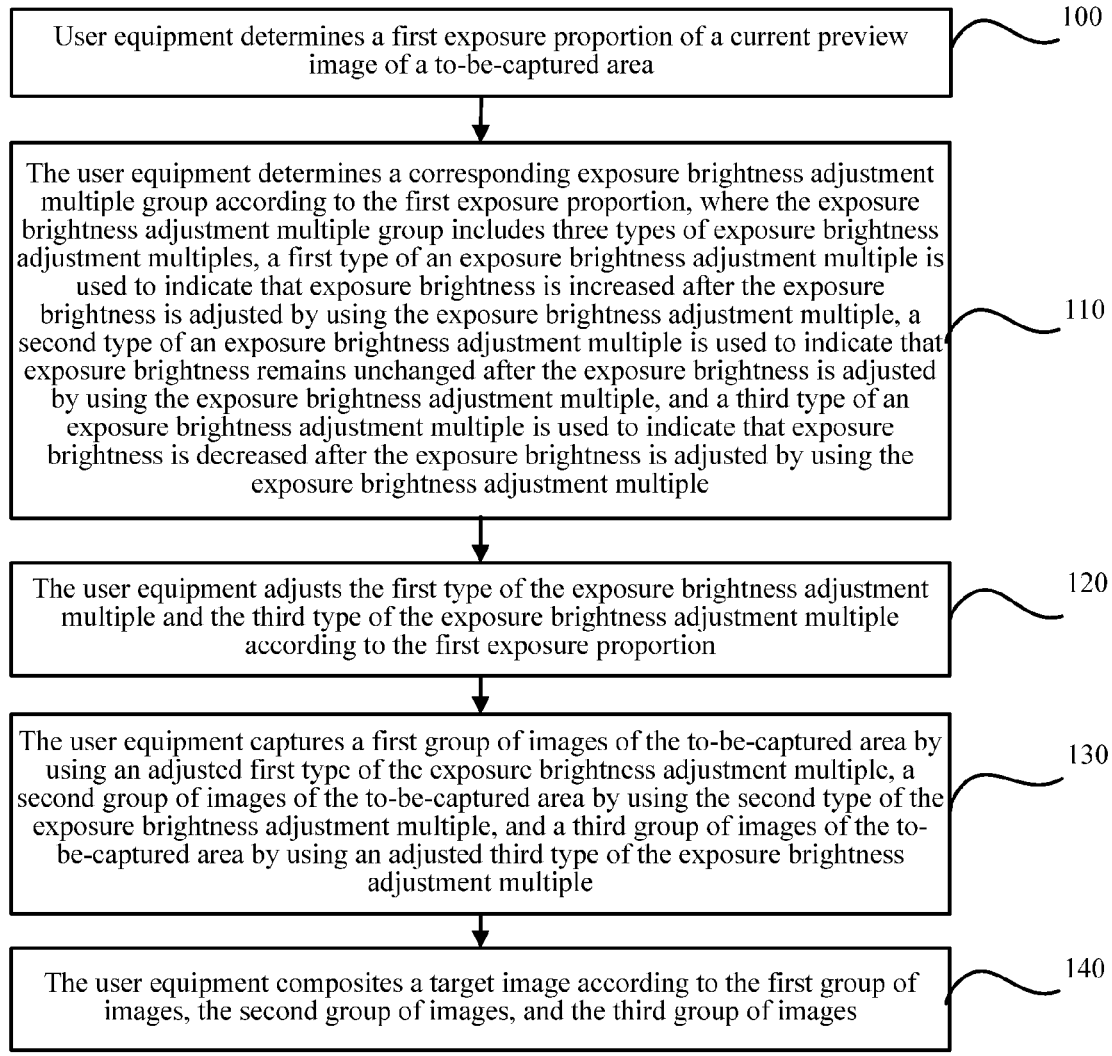
FIG. 1 is a flowchart of capturing an image according to an embodiment of the present invention.

Referring to FIG. 1, in this embodiment of the present invention, a procedure of capturing an image is as follows.

Step 100: User equipment determines a first exposure proportion of a current preview image of a to-be-captured area.

Step 110: The user equipment determines a corresponding exposure brightness adjustment multiple group according to the first exposure proportion, where the exposure brightness adjustment multiple group includes three types of exposure brightness adjustment multiples, a first type of an exposure brightness adjustment multiple is used to indicate that exposure brightness is increased after the exposure brightness is adjusted by using the exposure brightness adjustment multiple, a second type of an exposure brightness adjustment multiple is used to indicate that exposure brightness remains unchanged after the exposure brightness is adjusted by using the exposure brightness adjustment multiple, and a third type of an exposure brightness adjustment multiple is used to indicate that exposure brightness is decreased after the exposure brightness is adjusted by using the exposure brightness adjustment multiple.

Step 120: The user equipment adjusts the first type of the exposure brightness adjustment multiple and the third type of the exposure brightness adjustment multiple according to the first exposure proportion.

Step 130: The user equipment captures a first group of images of the to-be-captured area by using an adjusted first type of the exposure brightness adjustment multiple, a second group of images of the to-be-captured area by using the second type of the exposure brightness adjustment multiple, and a third group of images of the to-be-captured area by using an adjusted third type of the exposure brightness adjustment multiple.

Step 140: The user equipment composites a target image according to the first group of images, the second group of images, and the third group of images.

In the prior art, it is assumed that there are three exposure proportions: a first exposure proportion, a second exposure proportion, and a third exposure proportion. The first exposure proportion is 25%, the second exposure proportion is 20%, and the third exposure proportion is 15%. Exposure brightness adjustment multiple groups corresponding to 25%, 20%, and 15% are all (+1 exposure value (EV), 0 EV, −1.5 EV). +1 EV belongs to a first type of an exposure brightness adjustment multiple, 0 EV belongs to a second type of an exposure brightness adjustment multiple, and −1.5 EV belongs to a third type of an exposure brightness adjustment multiple. In the three exposure proportions, a first group of images, a second group of images, and a third group of images are captured by using (+1 EV, 0 EV, −1.5 EV), and a target image is composited according to the first group of images, the second group of images, and the third group of images. The exposure brightness adjustment multiple group does not change as the exposure proportions changes. Consequently, quality of a captured image has a relatively poor defect.

In this embodiment of the present invention, it is assumed that there are three exposure proportions: a first exposure proportion, a second exposure proportion, and a third exposure proportion. The first exposure proportion is 25%, the second exposure proportion is 20%, and the third exposure proportion is 15%. Exposure brightness adjustment multiple groups corresponding to 25%, 20%, and 15% are all (+1 EV, 0 EV, −1.5 EV). +1 EV belongs to a first type of an exposure brightness adjustment multiple, 0 EV belongs to a second type of an exposure brightness adjustment multiple, and −0.5 EV belongs to a third type of an exposure brightness adjustment multiple. However, in a case in which the first exposure proportion is 25%, the user equipment adjusts (+1

EV, 0 EV, −0.5 EV) to (+1 EV, 0 EV, −2 EV), and then captures an image according to (+1 EV, 0 EV, −2 EV). In a case in which the second exposure proportion is 20%, the user equipment also adjusts (+1 EV, 0 EV, −0.5 EV) to (+1 EV, 0 EV, −1.2 EV), and then captures an image according to (+1 EV, 0 EV, −1.2 EV). In a case in which the third exposure proportion is 15%, the user equipment also adjusts (+1 EV, 0 EV, −1.5 EV) to (+1 EV, 0 EV, −1 EV), and then captures an image according to (+1 EV, 0 EV, −1 EV). Although different exposure proportions correspond to a same exposure brightness adjustment multiple group, the exposure brightness adjustment multiple group is further adjusted according to the exposure proportions, so that quality of a captured image is improved.

In this embodiment of the present invention, the first exposure proportion includes a first overexposed proportion and/or a first underexposed proportion.

In this embodiment of the present invention, the user equipment may determine, according to the first exposure proportion, that a current scenario is an overexposed scenario or an underexposed scenario.

Embodiment 1

For different exposure scenarios, manners of the determining, by the user equipment, a corresponding exposure brightness adjustment multiple group according to the first exposure proportion are different. A description is given below by using an example in which a current scenario is an overexposed scenario.

In this embodiment of the present invention, the determining, by the user equipment, a corresponding exposure brightness adjustment multiple group according to the first exposure proportion may use the following manner: determining, by the user equipment, a brightness value of the preview image; decreasing, by the user equipment, the brightness value when determining that the first overexposed proportion reaches a first overexposed proportion threshold, and the first underexposed proportion does not reach a first underexposed proportion threshold; determining, by the user equipment, a second overexposed proportion and a second underexposed proportion of the preview image, and a first variation of the brightness value after the brightness value is decreased, when determining that a first pre-set condition is satisfied after the brightness value is decreased; and determining, by the user equipment, an exposure brightness adjustment multiple group corresponding to the second overexposed proportion when determining that the second overexposed proportion reaches a second overexposed proportion threshold and the second underexposed proportion does not reach a third underexposed proportion threshold.

The determining, by the user equipment, that the first overexposed proportion reaches a first overexposed proportion threshold is actually determining, by the user equipment, that a condition of performing an AE (Auto Exposure) adjustment is satisfied. The determining, by the user equipment, that the second overexposed proportion reaches a second overexposed proportion threshold is actually determining, by the user equipment, that a condition of entering a High Dynamic Range (HDR) mode is satisfied. In this way, before the HDR mode is entered, an AE adjustment needs to be performed. By combining an AE technology and an HDR technology, quality of a captured image is improved.

Performing, by the user equipment, an AE adjustment refers to that the user equipment may automatically adjust the brightness value according to an exposure proportion without adjusting the brightness value according to a user instruction.

Further, the brightness value may not be decreased when the user equipment determines that the condition of performing an AE adjustment is satisfied. When the brightness value is decreased, an underexposed proportion is increased, and when the underexposed proportion exceeds a threshold, image quality is relatively poor, and user experience is relatively poor. Therefore, to improve the image quality and user experience, when it is determined that the condition of performing an AE adjustment is satisfied, it needs to be further determined that the first underexposed proportion does not reach the first underexposed proportion threshold, and then the brightness value is decreased. That is, it needs to be further determined that the underexposed proportion can still be increased, and then the brightness value is decreased.

An initial scenario described above is an overexposed scenario, and after the user equipment adjusts the brightness, the scenario is still an overexposed scenario. In this case, the exposure brightness adjustment multiple group is determined according to an overexposed proportion.

In this case, the adjusting, by the user equipment, the first type of the exposure brightness adjustment multiple and the third type of the exposure brightness adjustment multiple according to the first exposure proportion may optionally use the following manner: adjusting, by the user equipment, the first type of the exposure brightness adjustment multiple according to the first underexposed proportion, the second underexposed proportion, and the first variation; and adjusting, by the user equipment, the third type of the exposure brightness adjustment multiple according to the first overexposed proportion and the second overexposed proportion.

The foregoing describes a case in which the initial scenario is an overexposed scenario, and after the user equipment decreases the brightness value, the scenario is still an overexposed scenario. In an application, a case in which an initial scenario is an overexposed scenario, and after the user equipment decreases the brightness value, the scenario is in an underexposed scenario also exists. Therefore, the determining, by the user equipment, a corresponding exposure brightness adjustment multiple group according to the first exposure proportion may use the following manner: determining, by the user equipment, a brightness value of the preview image; decreasing, by the user equipment, the brightness value when determining that the first overexposed proportion reaches a first overexposed proportion threshold and the first underexposed proportion does not reach a first underexposed proportion threshold; determining, by the user equipment, a second overexposed proportion and a second underexposed proportion of the preview image, and a first variation of the brightness value after the brightness value is decreased, when determining that a first pre-set condition is satisfied after the brightness value is decreased; and determining, by the user equipment, an exposure brightness adjustment multiple group corresponding to the second underexposed proportion when determining that the second underexposed proportion reaches a third underexposed proportion threshold and the second overexposed proportion does not reach a second overexposed proportion threshold.

That is, after the user equipment adjusts the brightness, it is determined that the scenario is an underexposed scenario. In this case, the exposure brightness adjustment multiple group is determined according to an underexposed proportion.

The determining, by the user equipment, that the first overexposed proportion reaches a first overexposed proportion threshold is actually determining, by the user equipment, that a condition of performing an AE adjustment is satisfied. The determining, by the user equipment, that the second underexposed proportion reaches a third underexposed proportion threshold is actually determining, by the user equipment, that a condition of entering the HDR mode is satisfied. In this way, before the HDR mode is entered, an AE adjustment needs to be performed. By combining the AE technology and the HDR technology, quality of a captured image is improved.

Further, the brightness value may not be decreased when the user equipment determines that the condition of performing an AE adjustment is satisfied. When the brightness value is decreased, an underexposed proportion is increased, and when the underexposed proportion exceeds a threshold, image quality is relatively poor, and user experience is relatively poor. Therefore, to improve the image quality and user experience, when it is determined that the condition of performing an AE adjustment is satisfied, it needs to be further determined that the first underexposed proportion does not reach the first underexposed proportion threshold, and then the brightness value is decreased. That is, it needs to be further determined that the underexposed proportion can still be increased, and then the brightness value is decreased.

In this case, the adjusting, by the user equipment, the first type of the exposure brightness adjustment multiple and the third type of the exposure brightness adjustment multiple according to the first exposure proportion may optionally use the following manner: adjusting, by the user equipment, the first type of the exposure brightness adjustment multiple according to the first underexposed proportion, the second underexposed proportion, and the first variation; and adjusting, by the user equipment, the third type of the exposure brightness adjustment multiple according to the first overexposed proportion and the second overexposed proportion.

Certainly, after a user decreases the brightness value, a case in which the second underexposed proportion reaches the third underexposed proportion threshold and the second overexposed proportion reaches the second overexposed proportion threshold may exist. That is, both overexposure and underexposure exist. In this case, the determining, by the user equipment, a corresponding exposure brightness adjustment multiple group according to the first exposure proportion may optionally use the following manner: determining, by the user equipment, a brightness value of the preview image; decreasing, by the user equipment, the brightness value when determining that the first overexposed proportion reaches a first overexposed proportion threshold and the first underexposed proportion does not reach a first underexposed proportion threshold; determining, by the user equipment, a second overexposed proportion and a second underexposed proportion of the preview image, and a first variation of the brightness value after the brightness value is decreased, when determining that a first pre-set condition is satisfied after the brightness value is decreased; and determining, by the user equipment, an exposure brightness adjustment multiple group corresponding to the second underexposed proportion and the second overexposed proportion when determining that the second underexposed proportion reaches a third underexposed proportion threshold and the second overexposed proportion reaches a second overexposed proportion threshold.

The determining, by the user equipment, that the first overexposed proportion reaches a first overexposed proportion threshold is actually determining, by the user equipment, that a condition of performing an AE adjustment is satisfied. The determining, by the user equipment, that the second underexposed proportion reaches a third underexposed proportion threshold and the second overexposed proportion reaches a second overexposed proportion threshold is actually determining, by the user equipment, that a condition of entering the HDR mode is satisfied. In this way, before the HDR mode is entered, an AE adjustment needs to be performed. By combining the AE technology and the HDR technology, quality of a captured image is improved.

Further, the brightness value may not be decreased when the user equipment determines that the condition of performing an AE adjustment is satisfied. When the brightness value is decreased, an underexposed proportion is increased, and when the underexposed proportion exceeds a threshold, image quality is relatively poor, and user experience is relatively poor. Therefore, to improve the image quality and user experience, when it is determined that the condition of performing an AE adjustment is satisfied, it needs to be further determined that the first underexposed proportion does not reach the first underexposed proportion threshold, and then the brightness value is decreased. That is, it needs to be further determined that the underexposed proportion can still be increased, and then the brightness value is decreased.

In this case, the adjusting, by the user equipment, the first type of the exposure brightness adjustment multiple and the third type of the exposure brightness adjustment multiple according to the first exposure proportion may optionally use the following manner: adjusting, by the user equipment, the first type of the exposure brightness adjustment multiple according to the first underexposed proportion, the second underexposed proportion, and the first variation; and adjusting, by the user equipment, the third type of the exposure brightness adjustment multiple according to the first overexposed proportion and the second overexposed proportion.

In this embodiment of the present invention, optionally, the first pre-set condition is that: the first variation reaches a first variation threshold, and/or the second underexposed proportion reaches the first underexposed proportion threshold.

In the foregoing description, the first pre-set condition is satisfied after the brightness value is decreased. In an actual application, the first pre-set condition may not be satisfied after the brightness value is decreased, and when the second overexposed proportion reaches the first overexposed proportion threshold, the brightness value needs to be continued to be decreased, until the first pre-set condition is satisfied.

That is, in the foregoing description, after the brightness value is adjusted by using AE, a condition of stopping decreasing the brightness value is satisfied, and the HDR mode is entered. In an actual application, after the brightness value is adjusted by using the AE, the condition of stopping decreasing the brightness value may not be satisfied, but the condition of performing an AE adjustment is satisfied. In this case, the brightness value needs to be continued to be decreased until the condition of stopping decreasing the brightness value is satisfied. That is, the HDR mode is not entered after an AE adjustment is performed on the brightness value once, but the HDR mode is entered after multiple AE adjustments.

For example, when determining that the first overexposed proportion reaches the first overexposed proportion threshold, and the first underexposed proportion does not reach the first underexposed proportion threshold, the user equipment decreases the brightness value to a brightness value 0, and adjusts the brightness value 0 to a brightness value 1. After the brightness value is adjusted from the brightness value 0 to the brightness value 1, the first pre-set condition is not satisfied, and when a current overexposed proportion reaches the first overexposed proportion threshold, the brightness value 1 is continued to be adjusted to a brightness value 2. After the brightness value 1 is adjusted to the brightness value 2, the first pre-set condition is not satisfied, and when a current overexposed proportion reaches the first overexposed proportion threshold, the brightness value 2 is continued to be adjusted to a brightness value 3. In this case, when it is determined that the first pre-set condition is satisfied, decreasing of the brightness value is stopped, and an overexposed proportion and an underexposed proportion when the brightness value is 3, and a variation between the brightness value 3 and the brightness value 0 are determined. When it is determined that the overexposed proportion when the brightness value is 3 reaches the second overexposed proportion threshold, and the underexposed proportion when the brightness value is 3 does not reach the third underexposed proportion threshold, an exposure brightness adjustment multiple group corresponding to the overexposed proportion when the brightness value is 3 is determined. The first type of the exposure brightness adjustment multiple is adjusted according the underexposed proportion when the brightness value is 3, an underexposed proportion when the brightness value is 0, and the variation between the brightness value 3 and the brightness value 0. The third type of the exposure brightness adjustment multiple is adjusted according to the overexposed proportion when the brightness value is 3 and an overexposed proportion when the brightness value is 0.

Therefore, the following operation is further included: returning, by the user equipment, to a step of determining that the second overexposed proportion reaches the first overexposed proportion threshold until the first pre-set condition is satisfied, when determining that the first pre-set condition is not satisfied after the brightness value is decreased, where the step includes the following operation: decreasing, by the user equipment, the brightness value when determining that a current overexposed proportion after the brightness value is decreased reaches the first overexposed proportion threshold and a current underexposed proportion after the brightness value is decreased does not reach the first underexposed proportion threshold.

For ease of understanding, the following example may be used to illustrate the returning to a step of decreasing the brightness value that is described above.

For example, when determining that the first overexposed proportion reaches the first overexposed proportion threshold, and the first underexposed proportion does not reach the first underexposed proportion threshold, the user equipment decreases the brightness value for the first time; when determining that the first pre-set condition is not satisfied after the brightness value is decreased for the first time, and that a second overexposed proportion after the brightness value is decreased for the first time reaches the first overexposed proportion threshold, and a second underexposed proportion after the brightness value is decreased for the first time does not reach the first underexposed proportion threshold, the user equipment decreases the brightness value for the second time; when determining that the first pre-set condition is not satisfied after the brightness value is decreased for the second time, and that a third overexposed proportion after the brightness value is decreased for the second time reaches the first overexposed proportion threshold, and a third underexposed proportion after the brightness value is decreased for the second time does not reach the first underexposed proportion threshold, the user equipment decreases the brightness value for the third time; and if determining that the first pre-set condition is still not satisfied after the brightness value is decreased for the third time, the user equipment continues to cyclically perform a process of decreasing the brightness value according to the foregoing cyclic process.

In this way, if the condition of stopping decreasing the brightness value is not satisfied after the user equipment adjusts the brightness value by using the AE, the user equipment continues to perform an AE adjustment to decrease the brightness value until the condition of stopping decreasing the brightness value is satisfied.

In this embodiment of the present invention, the exposure brightness adjustment multiple group is used only when an image is captured by using the HDR technology. If a condition of entering the HDR mode is not satisfied, it is meaningless to adjust the first type of the exposure brightness adjustment multiple and the third type of the exposure brightness adjustment multiple. Therefore, before the determining, by the user equipment, a second overexposed proportion, a second underexposed proportion, and a first variation after determining that a first pre-set condition is satisfied after the brightness value is decreased, the method further includes: determining, by the user equipment, to enter an HDR mode.

The determining, by the user equipment, to enter an HDR mode may optionally use the following manner: determining, by the user equipment, that the second overexposed proportion reaches the second overexposed proportion threshold; or determining, by the user equipment, that the second underexposed proportion reaches the third underexposed proportion threshold.

When an initial scenario is an overexposed scenario, and after the brightness value is decreased, if the scenario is still an overexposed scenario, the user equipment determines to enter the HDR mode by determining that the second overexposed proportion reaches the second overexposed proportion threshold. When the initial scenario is an overexposed scenario, and after the brightness value is decreased, if the scenario is an underexposed scenario, the user equipment determines that the second underexposed proportion reaches the third underexposed proportion threshold, and determines to enter the HDR mode. When the initial scenario is an overexposed scenario, and after the brightness value is decreased, if the scenario is not only an underexposed scenario but also an overexposed scenario, when determining that the second underexposed proportion reaches the third underexposed proportion threshold and/or the second underexposed proportion reaches the third underexposed proportion threshold, the user equipment may determine to enter the HDR mode.

The foregoing describes a manner of adjusting the first type of the exposure brightness adjustment multiple and the third type of the exposure brightness adjustment multiple in a case in which a scenario is determined as an overexposed scenario in an initial phase. Certainly, in an actual application, in the initial phase, the user equipment may determine that the scenario is an underexposed scenario according to the preview image. The following uses an example in which a current scenario is an underexposed scenario for illustration.

In this case, the determining, by the user equipment, a corresponding exposure brightness adjustment multiple group according to the first exposure proportion may optionally use the following manner: determining, by the user equipment, a brightness value; increasing, by the user equipment, the brightness value when determining that the first underexposed proportion reaches a second underexposed proportion threshold and the first overexposed proportion does not reach a third overexposed proportion threshold; determining, by the user equipment, a third overexposed proportion, a third underexposed proportion, and a second variation of the brightness value after the brightness value is increased, when determining that a second pre-set condition is satisfied after the brightness value is increased; and determining, by the user equipment, an exposure brightness adjustment multiple group corresponding to the third overexposed proportion when determining that the third overexposed proportion reaches a second overexposed proportion threshold and the third underexposed proportion does not reach a third underexposed proportion threshold.

The determining, by the user equipment, that the first underexposed proportion reaches a second underexposed proportion threshold is actually determining, by the user equipment, that a condition of performing an AE adjustment is satisfied. The determining, by the user equipment, that the third overexposed proportion reaches a second overexposed proportion threshold is actually determining, by the user equipment, that a condition of entering the HDR mode is satisfied. In this way, before the HDR mode is entered, an AE adjustment needs to be performed. By combining the AE technology and the HDR technology, quality of a captured image is improved.

Further, the brightness value may not be increased when the user equipment determines that the condition of performing an AE adjustment is satisfied. When the brightness value is increased, an overexposed proportion is increased, and when the overexposed proportion exceeds a threshold, image quality is relatively poor, and user experience is relatively poor. Therefore, to improve the image quality and user experience, when it is determined that the condition of performing an AE adjustment is satisfied, it needs to be further determined that the first overexposed proportion does not reach the third overexposed proportion threshold, and then the brightness value is increased. That is, it needs to be further determined that the overexposed proportion can still be increased, and then the brightness value is increased.

In the foregoing description, the user equipment determines that a scenario is an underexposed scenario in an initial phase. However, when the brightness value is increased, and the second pre-set condition is satisfied, the scenario is an overexposed scenario. In this case, although the scenario is an underexposed scenario in the initial phase, an exposure brightness adjustment multiple group corresponding to the third overexposed proportion is determined.

In this case, the adjusting, by the user equipment, the first type of the exposure brightness adjustment multiple and the third type of the exposure brightness adjustment multiple according to the first exposure proportion may optionally use the following manner: adjusting, by the user equipment, the third type of the exposure brightness adjustment multiple according to the first overexposed proportion, the third overexposed proportion, and the second variation; and adjusting, by the user equipment, the first type of the exposure brightness adjustment multiple according to the first underexposed proportion and the third underexposed proportion.

The foregoing describes a case in which a scenario is as an underexposed scenario in an initial phase, but the scenario is an overexposed scenario after the brightness value is increased. In an actual application, a case in which a scenario is an underexposed scenario in the initial phase but the scenario is still an underexposed scenario after the brightness value is increased also exists. Therefore, the determining, by the user equipment, a corresponding exposure brightness adjustment multiple group according to the first exposure proportion may optionally use the following manner: determining, by the user equipment, a brightness value; increasing, by the user equipment, the brightness value when determining that the first underexposed proportion reaches a second underexposed proportion threshold and the first overexposed proportion does not reach a third overexposed proportion threshold; determining, by the user equipment, a third overexposed proportion, a third underexposed proportion, and a second variation of the brightness value after the brightness value is increased, when determining that a second pre-set condition is satisfied after the brightness value is increased; and determining, by the user equipment, an exposure brightness adjustment multiple group corresponding to the third underexposed proportion when determining that the third underexposed proportion reaches a third underexposed proportion threshold and the third overexposed proportion does not reach a second overexposed proportion threshold.

The determining, by the user equipment, that first underexposed proportion reaches a second underexposed proportion threshold is actually determining, by the user equipment, that a condition of performing an AE adjustment is satisfied. The determining, by the user equipment, that the third underexposed proportion reaches a third underexposed proportion threshold is actually determining, by the user equipment, that a condition of entering the HDR mode is satisfied. In this way, before the HDR mode is entered, an AE adjustment needs to be performed. By combining the AE technology and the HDR technology, quality of a captured image is improved.

Further, the brightness value may not be increased when the user equipment determines that the condition of performing an AE adjustment is satisfied. When the brightness value is increased, an overexposed proportion is increased, and when the overexposed proportion exceeds a threshold, image quality is relatively poor, and user experience is relatively poor. Therefore, to improve the image quality and user experience, when it is determined that the condition of performing an AE adjustment is satisfied, it needs to be further determined that the first overexposed proportion does not reach the third overexposed proportion threshold, and then the brightness value is increased. That is, it needs to be further determined that the overexposed proportion can still be increased, and then the brightness value is increased.

In this case, the adjusting, by the user equipment, the first type of the exposure brightness adjustment multiple and the third type of the exposure brightness adjustment multiple according to the first exposure proportion may optionally use the following manner: adjusting, by the user equipment, the first type of the exposure brightness adjustment multiple according to the first underexposed proportion and the third underexposed proportion; and adjusting, by the user equipment, the third type of the exposure brightness adjustment multiple according to the first overexposed proportion, the third overexposed proportion, and the second variation.

Certainly, after the brightness value is increased, the third underexposed proportion reaches the third underexposed proportion threshold, and the third overexposed proportion reaches the second overexposed proportion threshold. In this case, the determining, by the user equipment, a corresponding exposure brightness adjustment multiple group according to the first exposure proportion may use the following manner: determining, by the user equipment, a brightness value; increasing, by the user equipment, the brightness value when determining that the first underexposed proportion reaches a second underexposed proportion threshold and the first overexposed proportion does not reach a third overexposed proportion threshold; determining, by the user equipment, a third overexposed proportion, a third underexposed proportion, and a second variation of the brightness value after the brightness value is increased, when determining that a second pre-set condition is satisfied after the brightness value is increased; and determining, by the user equipment, an exposure brightness adjustment multiple group corresponding to the third overexposed proportion and the third underexposed proportion when determining that the third underexposed proportion reaches a third underexposed proportion threshold and the third overexposed proportion reaches a second overexposed proportion threshold.

The determining, by the user equipment, that first underexposed proportion reaches a second underexposed proportion threshold is actually determining, by the user equipment, that a condition of performing an AE adjustment is satisfied. The determining, by the user equipment, that the third underexposed proportion reaches a third underexposed proportion threshold and the third overexposed proportion reaches a second overexposed proportion threshold is actually determining, by the user equipment, that a condition of entering the HDR mode is satisfied. In this way, before the HDR mode is entered, an AE adjustment needs to be performed. By combining the AE technology and the HDR technology, quality of a captured image is improved.

Further, the brightness value may not be increased when the user equipment determines that the condition of performing an AE adjustment is satisfied. When the brightness value is increased, an overexposed proportion is increased, and when the overexposed proportion exceeds a threshold, image quality is relatively poor, and user experience is relatively poor. Therefore, to improve the image quality and user experience, when it is determined that the condition of performing an AE adjustment is satisfied, it needs to be further determined that the first overexposed proportion does not reach the third overexposed proportion threshold, and then the brightness value is increased. That is, it needs to be further determined that the overexposed proportion can still be increased, and then the brightness value is increased.

In this case, the adjusting, by the user equipment, the first type of the exposure brightness adjustment multiple and the third type of the exposure brightness adjustment multiple according to the first exposure proportion may optionally use the following manner: adjusting, by the user equipment, the first type of the exposure brightness adjustment multiple according to the first underexposed proportion and the third underexposed proportion; and adjusting, by the user equipment, the third type of the exposure brightness adjustment multiple according to the first overexposed proportion, the third overexposed proportion, and the second variation.

In this embodiment of the present invention, optionally, the second pre-set condition is that: the second variation reaches a second variation threshold and/or the third overexposed proportion reaches the third overexposed proportion threshold.

The foregoing describes three manners of determining an exposure brightness adjustment multiple group: the first manner is that: determining, by the user equipment, an exposure brightness adjustment multiple group corresponding to the second overexposed proportion when determining that the second overexposed proportion reaches the second overexposed proportion threshold and the second underexposed proportion does not reach the third underexposed proportion threshold; the second manner is that: determining, by the user equipment, an exposure brightness adjustment multiple group corresponding to the second underexposed proportion when determining that the second underexposed proportion reaches the third underexposed proportion threshold and the second overexposed proportion does not reach the second overexposed proportion threshold; and the third manner is that: determining, by the user equipment, an exposure brightness adjustment multiple group corresponding to the second underexposed proportion and the second overexposed proportion when determining that the second underexposed proportion reaches the third underexposed proportion threshold and the second overexposed proportion reaches the second overexposed proportion threshold.

Main differences of the foregoing three manners are that: if only an overexposed proportion reaches a threshold but an underexposed proportion does not reach a threshold, the first type of the exposure brightness adjustment multiple group is determined in this case; if only the overexposed proportion does not reach the threshold but the underexposed proportion reaches the threshold, the second type of the exposure brightness adjustment multiple group is determined in this case; and if the overexposed proportion reaches the threshold and the underexposed proportion also reaches the threshold, the third type of the exposure brightness adjustment multiple group is determined in this case. That is, the first type of the exposure brightness adjustment multiple group corresponds to a scenario in which the overexposed proportion reaches the threshold but the underexposed proportion does not reach the threshold; the second type of the exposure brightness adjustment multiple group corresponds to a scenario in which the overexposed proportion does not reach the threshold but the underexposed proportion reaches the threshold; and the third type of the exposure brightness adjustment multiple group corresponds to a scenario in which the overexposed proportion reaches the threshold and the underexposed proportion also reaches the threshold.

In the foregoing description, the second pre-set condition is satisfied after the brightness value is increased. In an actual application, the second pre-set condition may not be satisfied after the brightness value is increased, and if the third underexposed proportion reaches the second underexposed proportion threshold, the brightness value needs to be continued to be increased until the second pre-set condition is satisfied.

That is, in the foregoing description, after the brightness value is adjusted by using the AE, a condition of stopping increasing the brightness value is satisfied, and the HDR mode is entered. In an actual application, after the brightness value is adjusted by using the AE, the condition of stopping increasing the brightness value may not be satisfied, but the condition of performing an AE adjustment is satisfied. In this case, the brightness value needs to be continued to be increased until the condition of stopping increasing the brightness value is satisfied. That is, the HDR mode is not entered after an AE adjustment is performed on the brightness value once, but the HDR mode is entered after multiple AE adjustments.

For example, when determining that the first underexposed proportion reaches the second underexposed proportion threshold and the first overexposed proportion does not reach the third overexposed proportion threshold, the user equipment increases the brightness value to a brightness value 0, and adjusts the brightness value 0 to a brightness value 1. After the brightness value is adjusted from the brightness value 0 to the brightness value 1, the second pre-set condition is not satisfied, and when an underexposed proportion of the current brightness value reaches the second underexposed proportion threshold, the brightness value 1 is continued to be adjusted to a brightness value 2. After the brightness value 1 is adjusted to the brightness value 2, the second pre-set condition is not satisfied, and when the underexposed proportion of the current brightness value reaches the second underexposed proportion threshold, the brightness value 2 is continued to be adjusted to a brightness value 3. In this case, when it is determined that the second pre-set condition is satisfied and the underexposed proportion of the current brightness value reaches the second underexposed proportion threshold, decreasing of the brightness value is stopped, and an overexposed proportion and an underexposed proportion when the brightness value is 3, and a variation between the brightness value 3 and the brightness value 0 are determined. When it is determined that the overexposed proportion when the brightness value is 3 reaches the second overexposed proportion threshold, an exposure brightness adjustment multiple group corresponding to the overexposed proportion when the brightness value is 3 is determined. The type of the exposure brightness adjustment multiple is adjusted according the underexposed proportion when the brightness value is 3 and an underexposed proportion when the brightness value is 0. The third type of the exposure brightness adjustment multiple is adjusted according to the overexposed proportion when the brightness value is 3, an overexposed proportion when the brightness value is 0, and the variation between the brightness value 3 and the brightness value 0.

Therefore, the method further includes the following operation: returning, by the user equipment, to a step of determining that the third underexposed proportion reaches the second underexposed proportion threshold until the second pre-set condition is satisfied, when determining that the second pre-set condition is not satisfied after the brightness value is increased, where the step includes the following operation: increasing, by the user equipment, the brightness value when determining that a current underexposed proportion after the brightness value is increased reaches the second underexposed proportion threshold and a current overexposed proportion after the brightness value is increased does not reach the third overexposed proportion threshold.

For ease of understanding, the following example may be used to illustrate the returning to a step of decreasing the brightness value that is described above.

For example, when determining that the first underexposed proportion reaches the second underexposed proportion threshold, and the first overexposed proportion does not reach the third overexposed proportion threshold, the user equipment increases the brightness value for the first time; when determining that the second pre-set condition is not satisfied after the brightness value is increased for the first time, and that a second underexposed proportion after the brightness value is increased for the first time reaches the second underexposed proportion threshold, and a first overexposed proportion after the brightness value is increased for the first time does not reach the third overexposed proportion threshold, the user equipment increases the brightness value for the second time; when determining that the second pre-set condition is not satisfied after the brightness value is increased for the second time, and that a third underexposed proportion after the brightness value is increased for the second time reaches the second underexposed proportion threshold, and a third overexposed proportion after the brightness value is increased for the second time does not reach the third overexposed proportion threshold, the user equipment increases the brightness value for the third time; and if determining that the second pre-set condition is still not satisfied after the brightness value is increased for the third time, the user equipment continues to cyclically perform a process of increasing the brightness value according to the foregoing cyclic process.

In this way, if the condition of stopping increasing the brightness value is not satisfied after the user equipment adjusts the brightness value by using the AE, the user equipment continues to perform an AE adjustment to increase the brightness value until the condition of stopping increasing the brightness value is satisfied.

In this embodiment of the present invention, after the user equipment increases the brightness value, if a condition of entering the HDR mode is satisfied, it is meaningful to determine a third overexposed proportion, a third underexposed proportion, and a second variation. Therefore, to avoid a waste of resources, before the determining, by the user equipment, a third overexposed proportion, a third underexposed proportion, and a second variation after determining that a second pre-set condition is satisfied, the method further includes the following operations: determining, by the user equipment, that the third underexposed proportion reaches the third underexposed proportion threshold; or determining, by the user equipment, that the third overexposed proportion reaches the second overexposed proportion threshold.

When an initial scenario is an underexposed scenario, and after the brightness value is increased, if the scenario is still an underexposed scenario, the user equipment determines to enter the HDR mode by determining that the third underexposed proportion reaches the third underexposed proportion threshold. When the initial scenario is an underexposed scenario, after the brightness value is increased, if the scenario is an overexposed scenario, the user equipment determines that the third overexposed proportion reaches the second overexposed proportion threshold, and determines to enter the HDR mode. When the initial scenario is an underexposed scenario, after the brightness value is increased, if the scenario is not only an underexposed scenario but also an overexposed scenario, when determining that the third underexposed proportion reaches the third underexposed proportion threshold and/or the third overexposed proportion reaches the second overexposed proportion threshold, the user equipment may determine to enter the HDR mode.

In this embodiment of the present invention, optionally, Embodiment 1 is applied to a scenario in which user equipment has only one camera module. In this scenario, the AE technology may be combined with the HDR technology to capture an image, so as to improve quality of the captured image. Certainly, Embodiment 1 may be applied to another scenario, which is not specifically limited herein.

The foregoing describes a case in which user equipment has only one camera module. When user equipment has only one camera module, a technology combining the AE technology and the HDR technology may be used. When a brightness value is adjusted by using AE, to improve user experience, when the brightness value is decreased in an overexposed scenario, a case in which an underexposed proportion cannot reach an upper limit needs to be satisfied. If the underexposed proportion reaches the upper limit, and the brightness value is decreased, a user may obviously feel a change of the brightness value of a preview image. If the brightness value is decreased for multiple times, the user may frequently feel changes of the brightness value of the preview image, resulting in relatively poor user experience. Therefore, when a brightness value is decreased in an overexposed scenario, the brightness value may be decreased only when a case in which an underexposed proportion cannot reach an upper limit is satisfied. Similarly, when the brightness value is increased in an underexposed scenario, a case in which an overexposed proportion cannot reach an upper limit needs to be satisfied. If the overexposed proportion reaches the upper limit, and the brightness value is increased, a user may obviously feel a change of the brightness value of a preview image. If the brightness value is increased for multiple times, the user may frequently feel changes of the brightness value of the preview image, resulting in relatively poor user experience. Therefore, when a brightness value is increased in an underexposed scenario, the brightness value may be increased only when a case in which an overexposed proportion cannot reach an upper limit is satisfied. Therefore, in the case in which user equipment has only one camera module, when a brightness value is decreased in an overexposed scenario, a condition in which an underexposed proportion cannot reach an upper limit needs to be satisfied. When a brightness value is increased in an underexposed scenario, a condition in which an overexposed proportion cannot reach an upper limit needs to be satisfied.

However, with development of technologies, a case in which user equipment has multiple camera modules may occur. For example, user equipment has two camera modules: a primary camera module and a secondary camera module. Because an image presented by the user equipment is an image of the primary camera module, if the user equipment adjusts a brightness value by using the secondary camera module, although an underexposed proportion has reached an upper limit when the brightness value is decreased, because an image in this case is not presented on the user equipment, whether the underexposed proportion reaches the upper limit does not need to be considered when the brightness value is decreased. Similarly, if the user equipment adjusts a brightness value by using the secondary camera module, although an overexposed proportion has reached an upper limit when the brightness value is increased, because an image in this case is not presented on the user equipment, whether the overexposed proportion has reached the upper limit when the brightness value is increased does not need to be considered.

Embodiment 2

The embodiment described above is a case in which user equipment has only one camera module. With development of technologies, a case in which user equipment has multiple camera modules exists. In this case, the adjusting, by the user equipment, the third type of the exposure brightness adjustment multiple according to the first exposure proportion may optionally use the following manner: determining, by the user equipment, a brightness value of the preview image; decreasing, by the user equipment, the brightness value, and calculating a third variation of the brightness value when determining that the first overexposed proportion reaches a second overexposed proportion threshold; determining, by the user equipment, a fourth overexposed proportion after the brightness value of the preview image is decreased; and adjusting, by the user equipment, the third type of the exposure brightness adjustment multiple according to the third variation when determining that the fourth overexposed proportion does not reach a fourth overexposed proportion threshold.

That is, in the case in which the user equipment has multiple camera modules, if a condition of entering an HDR module is satisfied, the brightness value needs to be continued to be decreased. If the fourth overexposed proportion after the brightness value is decreased does not reach the fourth overexposed proportion threshold, the third type of the exposure brightness adjustment multiple is adjusted according to the third variation.

In this embodiment of the present invention, optionally, the fourth overexposed proportion threshold is less than the second overexposed proportion threshold.

It should be noted that adjusting an overexposed proportion of the user equipment from the first overexposed proportion to the fourth overexposed proportion may be implemented by decreasing the brightness value once, or may be implemented by decreasing the brightness value for multiple times. This is not specifically limited herein. Alternatively, the adjusting, by the user equipment, the first type of the exposure brightness adjustment multiple according to the first exposure proportion may use the following manner: determining, by the user equipment, a brightness value of the preview image; increasing, by the user equipment, the brightness value, and calculating a fourth variation of the brightness value when determining that the first underexposed proportion reaches a third underexposed proportion threshold; determining, by the user equipment, a fourth underexposed proportion of the preview image after the brightness value is increased; and adjusting, by the user equipment, the first type of the exposure brightness adjustment multiple according to the fourth variation when determining that the fourth underexposed proportion does not reach a fourth underexposed proportion threshold.

In this embodiment of the present invention, optionally, the fourth underexposed proportion threshold is less than the third underexposed proportion threshold.

It should be noted that adjusting an overexposed proportion of the user equipment from the first underexposed proportion to the fourth underexposed proportion may be implemented by increasing the brightness value once, or may be implemented by increasing the brightness value for multiple times. This is not specifically limited herein.

In this embodiment of the present invention, optionally, Embodiment 2 is applied to a scenario in which user equipment has at least two camera modules. Certainly, Embodiment 2 may be applied to another scenario, which is not specifically limited herein.

Embodiment 3

If an ROI (Region of Interest, region of interest) exists in the preview image, to further improve quality of a captured image and improve user experience, after the adjusting, by the user equipment, the first type of the exposure brightness adjustment multiple and the third type of the exposure brightness adjustment multiple according to the first exposure proportion, and before the capturing a first group of images, a second group of images, and a third group of images, the method further includes the following operations: determining, by the user equipment, a second exposure proportion of a region of interest (ROI) of the preview image and a weight value of the ROI; calculating, by the user equipment, a third exposure proportion according to the second exposure proportion and the weight value; and adjusting, by the user equipment, the adjusted first type of the exposure brightness adjustment multiple and the adjusted third type of the exposure brightness adjustment multiple again according to the third exposure proportion.

That is, if an ROI region exists in a generated target image, after the first type of the exposure brightness adjustment multiple and the third type of the exposure brightness adjustment multiple are adjusted by using the first exposure proportion, an adjusted first type of the exposure brightness adjustment multiple and an adjusted third type of the exposure brightness adjustment multiple may further be adjusted again.

In this embodiment of the present invention, optionally, the second underexposed proportion threshold is greater than or equal to the third underexposed proportion threshold, and the first overexposed proportion threshold is greater than or equal to the second overexposed proportion threshold.

In this embodiment of the present invention, optionally, Embodiment 3 is applied to a scenario in which a target image has an ROI. Certainly, Embodiment 3 may be applied to another scenario, which is not specifically limited herein.

Embodiment 4

In this embodiment of the present invention, user equipment may adjust a brightness value of a current presented preview image according to brightness of the current presented preview image or a user instruction. For example, a human face exists in the current presented preview image of the user equipment, but brightness of the human face is relatively dark. In this case, the user equipment may improve a brightness value of the human face. For another example, brightness of a partial region in the current presented preview image of the user equipment is relatively dark, to improve the brightness of the region whose brightness is relatively dark, a user may perform a click operation on the region whose brightness is relatively dark in the current presented preview image of the user equipment, so that when receiving the click operation of the user, that is, the user instruction is the click operation, the user equipment increases a brightness value of the region whose brightness is relatively dark.

Therefore, in this embodiment of the present invention, before the determining, by user equipment, a first exposure proportion of a current preview image of a to-be-captured area, the method further includes the following operations: increasing, by the user equipment, the brightness value of the preview image, and determining a fifth variation after the brightness value is increased; and determining, by the user equipment, a fourth exposure proportion before the brightness value of the preview image is increased.

In this case, the determining, by user equipment, a first exposure proportion of a current preview image of a to-be-captured area may optionally use the following manner: determining, by the user equipment, the first exposure proportion after the brightness value of the current preview image is increased.

That is, before determining the first exposure proportion of the current preview image of the to-be-captured area, if the user equipment increases the brightness value of the preview image, the first exposure proportion determined by the user equipment is the first exposure proportion after the brightness value of the preview image is increased.

In this case, the adjusting, by the user equipment, the first type of the exposure brightness adjustment multiple and the third type of the exposure brightness adjustment multiple according to the first exposure proportion may optionally use the following manner to perform adjustment: adjusting, by the user equipment, the first type of the exposure brightness adjustment multiple and the third type of the exposure brightness adjustment multiple according to the first exposure proportion, the fourth exposure proportion, and the fifth variation.

In this embodiment of the present invention, optionally, the first exposure proportion includes the first overexposed proportion and/or the first underexposed proportion, and the fourth exposure proportion includes a fifth overexposed proportion and/or a fifth underexposed proportion; and in this case, the adjusting, by the user equipment, the first type of the exposure brightness adjustment multiple and the third type of the exposure brightness adjustment multiple according to the first exposure proportion, the fourth exposure proportion, and the fifth variation may optionally use the following manner: adjusting, by the user equipment, the first type of the exposure brightness adjustment multiple according to the first underexposed proportion and the fifth underexposed proportion; and adjusting, by the user equipment, the third type of the exposure brightness adjustment multiple according to the first overexposed proportion, the fifth overexposed proportion, and the fifth variation.

In the foregoing description, the user equipment increases the brightness value according to brightness of the current presented preview image or a user instruction. However, in an actual application, the user equipment may decrease the brightness value according to brightness of the current presented preview image or a user instruction. Therefore, before the determining, by user equipment, a first exposure proportion of a current preview image of a to-be-captured area, the method further includes the following operations: decreasing, by the user equipment, the brightness value of the preview image, and determining a sixth variation after the brightness value is decreased; and determining, by the user equipment, a fifth exposure proportion before the brightness value of the preview image is decreased; and in this case, the determining, by user equipment, a first exposure proportion of a current preview image of a to-be-captured area may optionally use the following manner: determining, by the user equipment, the first exposure proportion after the brightness value of the current preview image is decreased.

In this embodiment of the present invention, the adjusting, by the user equipment, the first type of the exposure brightness adjustment multiple and the third type of the exposure brightness adjustment multiple according to the first exposure proportion may optionally use the following manner adjusting, by the user equipment, the first type of the exposure brightness adjustment multiple and the third type of the exposure brightness adjustment multiple according to the first exposure proportion, the fifth exposure proportion, and the sixth variation.

In this embodiment of the present invention, optionally, the first exposure proportion includes the first overexposed proportion and/or the first underexposed proportion, and the fifth exposure proportion includes a sixth overexposed proportion and/or a sixth underexposed proportion; and in this case, the adjusting, by the user equipment, the first type of the exposure brightness adjustment multiple and the third type of the exposure brightness adjustment multiple according to the first exposure proportion, the fifth exposure proportion, and the sixth variation may optionally use the following manner: adjusting, by the user equipment, the first type of the exposure brightness adjustment multiple according to the first underexposed proportion, the sixth underexposed proportion, and the sixth variation; and adjusting, by the user equipment, the third type of the exposure brightness adjustment multiple according to the first overexposed proportion and the sixth overexposed proportion.

In this embodiment of the present invention, optionally, Embodiment 4 is applied to a human face scenario and a touch scenario. Certainly, Embodiment 4 may be applied to another scenario, which is not specifically limited herein.

In this embodiment of the present invention, to further improve image quality and improve user experience, the compositing, by the user equipment, a target image according to the first group of images, the second group of images, and the third group of images may optionally use the following manner: increasing, by the user equipment, a composite weight of a target area of the second group of images; and compositing, by the user equipment, the target image according to the first group of images, the second group of images, an increased composite weight of the second group of images, and the third group of images.

The target area may be a human face area, or may be a touch area.

The touch area may be an area clicked by a user, or may be an area dragged by the user.

In this solution, after determining an exposure brightness adjustment multiple group according to a current scenario, the user equipment also needs to adjust the first type of the exposure brightness adjustment multiple and the third type of the exposure brightness adjustment multiple in the exposure brightness adjustment multiple group. Instead of capturing an image by directly using the determined exposure brightness adjustment multiple group, the first type of the exposure brightness adjustment multiple and the third type of the exposure brightness adjustment multiple in the exposure brightness adjustment multiple group are adjusted according to a situation of the scenario. Therefore, quality of a captured image is improved, and user experience is improved.

In this embodiment of the present invention, optionally, each group of images of the first group of images, the second group of images, and the third group of images that composite the target image includes at least one image.

In this embodiment, when the target image is composited according to the first group of images, the second group of images, and the third group of images, the second group of images is used as a reference image. Therefore, the second type of the exposure brightness adjustment multiple used by the second group of images is not adjusted.

Embodiment 5

In an actual application, because a target image generated by using an HDR technology is composited by multiple images, if a moving object exists in content of the image, after composition, a double image effect, also referred to as a ghosting effect, occurs when the moving object is compiled. Consequently, image quality is relatively poor.

Figure 2:
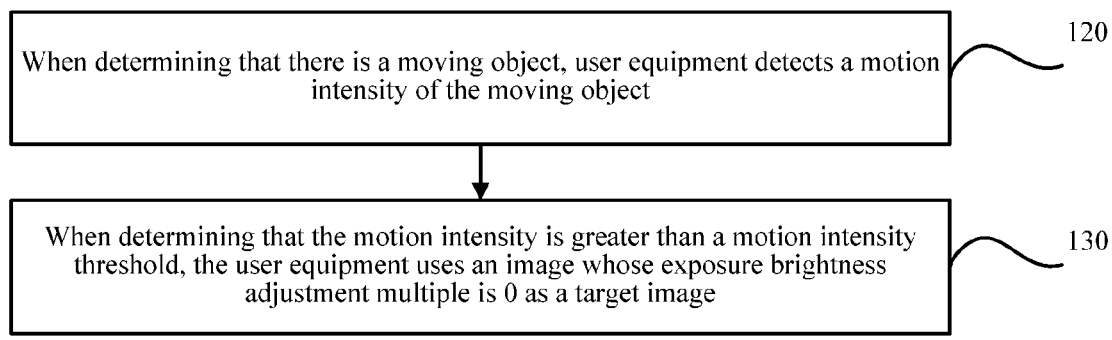
FIG. 2 is another flowchart of capturing an image according to an embodiment of the present invention.

To improve the image quality and improve user experience, referring to FIG. 2, in this embodiment of the present invention, another method for capturing an image is also improved. The method is specifically as follows:

Step 200: When determining that there is a moving object, user equipment detects a motion intensity of the moving object.

Step 210: When determining that the motion intensity is greater than a motion intensity threshold, the user equipment uses an image whose exposure brightness adjustment multiple is 0 as a target image.

Certainly, the motion intensity may be less than or equal to the motion intensity threshold. In this case, the target image is generated by using a short exposure technology.

Optionally, the target image may be generated in a manner of increasing ghosting processing.

The manner of increasing ghosting processing may be specifically implemented by adjusting a ghosting detection threshold.

Similarly, the user equipment may determine that there is no moving object. In this case, the target image is generated by using a long exposure technology.

Optionally, the target image may be generated in a manner of decreasing ghosting processing.

The manner of decreasing or eliminating ghosting processing may be specifically implemented by adjusting a ghosting detection threshold.

The short exposure time refers to that: if an exposure time is not a multiple of a banding step, the exposure time is adjusted to a value of the multiple of the banding step that is nearest to the exposure time and is less than the exposure time.

The long exposure time refers to that: if an exposure time is not a multiple of a banding step, the exposure time is adjusted to a value of the multiple of the banding step that is nearest to the exposure time and is greater than the exposure time.

For example, when a banding step is 10 ms, if an exposure time is 15 ms, a short exposure time is 10 ms, and a long exposure time is 20 ms.

For another example, when a banding step is to ms, if an exposure time is 25 ms, a short exposure time is 20 ms, and a long exposure time is 30 ms.

For another example, when a banding step is 8.3 ms, if an exposure time is 10 ms, a short exposure time is 8.3 ms, and a long exposure time is 16.6 ms.

The banding step may be calculated by using the following formula:

$$\text{banding step} = \tfrac{1}{2} * \text{an artificial light source period}$$

Optionally, the artificial light source period is 50 Hz.

In this embodiment of the present invention, the determining, by user equipment, that there is a moving object has multiple manners. Optionally, the following manner may be used: determining, by the user equipment, that the user equipment is in a moving state, and/or that there is an object in a moving state in a to-be-captured area.

The user equipment may determine, by using a sensor, that the user equipment is in a moving state, and the user equipment may determine, by using content of an image, that there is an object in a moving state in the to-be-captured area. Certainly, this manner is not limited thereto.

In this solution, if determining that there is a moving object, and detects that a motion intensity of the moving object is greater than a motion intensity threshold, the user equipment may use an image whose exposure brightness adjustment multiple is 0 as a target image instead of generating an image by using the HDR technology. Therefore, image quality is improved, and user experience is improved by avoiding a ghosting problem.

In this embodiment of the present invention, optionally, Embodiment 5 is applied to a moving scenario. A main idea of Embodiment 5 is: when there is no moving object, a long exposure policy is used, and/or a ghosting detection threshold inside an HDR algorithm is decreased or relaxed. When there is a moving object, and a motion intensity is less than a motion intensity threshold, a short exposure policy is used to improve a frame rate, and/or a ghosting detection threshold inside an HDR algorithm is increased. When there is a moving object, and a motion intensity is greater than or equal to a motion intensity threshold, an image whose adjustment multiple is 0 is used as a target image.

Embodiment 6

Light sources that are commonly used all belong to artificial light sources. Energy of an artificial light source is released using sine waves of different periods. When user equipment senses light, times at which lines start to sense light are different. This is called rolling shutter exposure. Energy sensed by each line may be represented by using a sine integral area. A larger area indicates more sensed energy, and the line is brighter; otherwise, a smaller integral area indicates less sensed energy, and the line is darker. Different exposure lines have different exposure sensing times. Therefore, areas and brightness are different, resulting in a banding phenomenon of alternate lightness and darkness. If banding pattern is used when an image is generated by using an HDR technology, an artificial effect similar to colour fringes may be caused.

Figure 3:
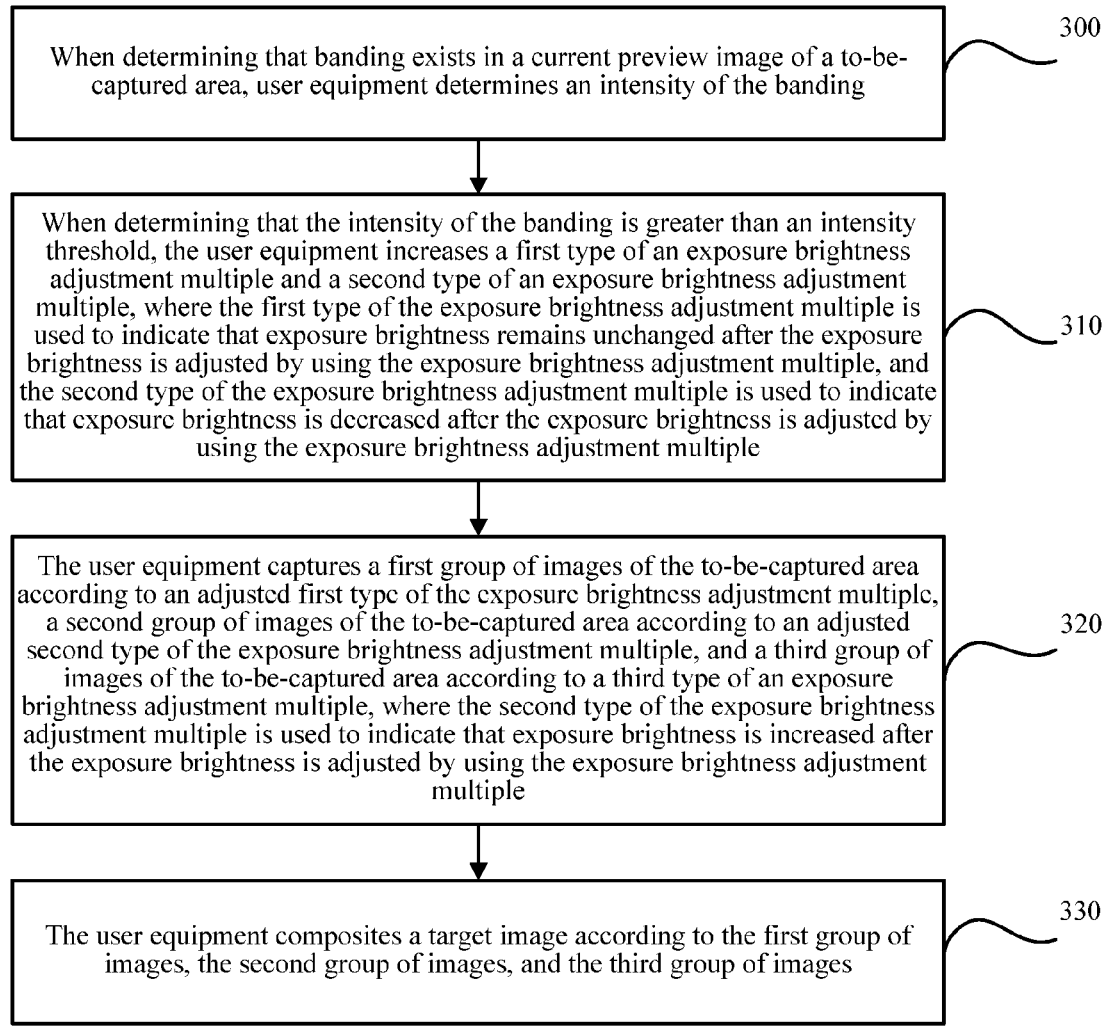
FIG. 3 is another flowchart of capturing an image according to an embodiment of the present invention.

Therefore, to improve image quality and improve user experience, referring to FIG. 3, this embodiment of the present invention further provides a method for capturing an image, and a specific process is as follows:

Step 300: When determining that banding exists in a current preview image of a to-be-captured area, user equipment determines an intensity of the banding.

Step 310: When determining that the intensity of the banding is greater than an intensity threshold, the user equipment increases a first type of an exposure brightness adjustment multiple and a second type of an exposure brightness adjustment multiple, where the first type of the exposure brightness adjustment multiple is used to indicate that exposure brightness remains unchanged after the exposure brightness is adjusted by using the exposure brightness adjustment multiple, and the second type of the exposure brightness adjustment multiple is used to indicate that exposure brightness is decreased after the exposure brightness is adjusted by using the exposure brightness adjustment multiple.

Step 320: The user equipment captures a first group of images of the to-be-captured area according to an adjusted first type of the exposure brightness adjustment multiple, a second group of images of the to-be-captured area according to an adjusted second type of the exposure brightness adjustment multiple, and a third group of images of the to-be-captured area according to a third type of an exposure brightness adjustment multiple, where the second type of the exposure brightness adjustment multiple is used to indicate that exposure brightness is increased after the exposure brightness is adjusted by using the exposure brightness adjustment multiple.

Step 330: The user equipment composites a target image according to the first group of images, the second group of images, and the third group of images.

In this embodiment of the present invention, further, after the determining, by user equipment, that the intensity of the banding is greater than an intensity threshold, and before the capturing a third group of images of the to-be-captured area according to a third type of an exposure brightness adjustment multiple, the method further includes the following operations: adjusting, by the user equipment, the third type of the exposure brightness adjustment multiple; and in this case, the capturing, by the user equipment, a third group of images of the to-be-captured area according to a third type of an exposure brightness adjustment multiple may optionally use the following manner: capturing, by the user equipment, the third group of images of the to-be-captured area according to an adjusted third type of the exposure brightness adjustment multiple.

In this embodiment of the present invention, optionally, when determining that the intensity of the banding is less than or equal to the intensity threshold, the user equipment increases the second type of the exposure brightness adjustment multiple and/or decreases a weight value of the second group of images.

A main idea of Embodiment 6 is as follows: If a banding effect exists, but an intensity of banding of a current preview image does not satisfy a condition, that is, an intensity of banding of an image whose exposure brightness adjustment multiple is 0 is less than or equal to an intensity threshold, the second type of the exposure brightness adjustment multiple may be increased to decrease a banding effect of a second type of an image, or a weight value of the second group of images is decreased to decrease a weight value of a target image. If a banding effect exists, but an intensity of the banding of a current preview image satisfies a condition, that is, an intensity of banding of an image whose exposure brightness adjustment multiple is 0 is greater than an intensity threshold, the first type of the exposure brightness adjustment multiple and the second type of the exposure brightness adjustment multiple are increased. For example, the first type of the exposure brightness adjustment multiple is changed from 0 EV to 0.5 EV, the second type of the exposure brightness adjustment multiple is changed from −1.5 EV to +0.5 EV, and the second type of the exposure brightness adjustment multiple remains unchanged or may be increased.

In this embodiment of the present invention, optionally, each group of images of the first group of images, the second group of images, and the third group of images that composite the target image includes at least one image.

In this embodiment, when the target image is composited according to the first group of images, the second group of images, and the third group of images, the second group of images is used as a reference image. Therefore, the second type of the exposure brightness adjustment multiple used by the second group of images is not adjusted.

Figure 4A:
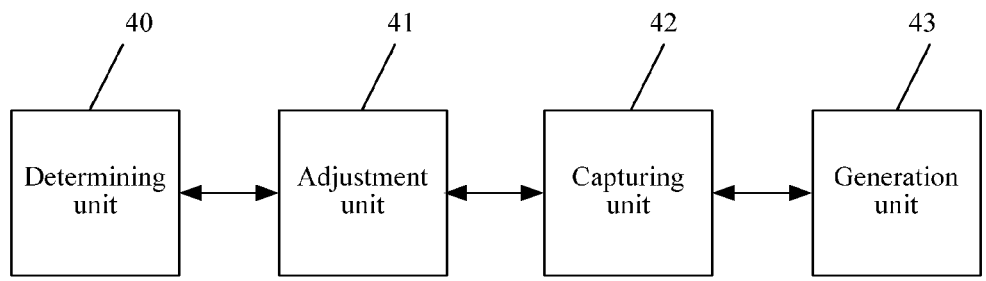
FIG. 4A is a schematic diagram of user equipment according to an embodiment of the present invention.

Referring to FIG. 4A, in this embodiment of the present invention, user equipment is provided, including: a determining unit 40, an adjustment unit 41, a capturing unit 42, and a generation unit 43.

The determining unit 40 is configured to determine a first exposure proportion of a current preview image of a to-be-captured area.

The determining unit 40 is further configured to determine a corresponding exposure brightness adjustment multiple group according to the first exposure proportion, where the exposure brightness adjustment multiple group includes three types of exposure brightness adjustment multiples, a first type of an exposure brightness adjustment multiple is used to indicate that exposure brightness is increased after the exposure brightness is adjusted by using the exposure brightness adjustment multiple, a second type of an exposure brightness adjustment multiple is used to indicate that exposure brightness remains unchanged after the exposure brightness is adjusted by using the exposure brightness adjustment multiple, and a third type of an exposure brightness adjustment multiple is used to indicate that exposure brightness is decreased after the exposure brightness is adjusted by using the exposure brightness adjustment multiple.

The adjustment unit 41 is configured to adjust the first type of the exposure brightness adjustment multiple and the third type of the exposure brightness adjustment multiple according to the first exposure proportion.

The capturing unit 42 is configured to capture a first group of images of the to-be-captured area by using an adjusted first type of the exposure brightness adjustment multiple, a second group of images of the to-be-captured area by using the second type of the exposure brightness adjustment multiple, and a third group of images of the to-be-captured area by using an adjusted third type of the exposure brightness adjustment multiple.

The generation unit 43 is configured to composite a target image according to the first group of images, the second group of images, and the third group of images.

Optionally, the first exposure proportion includes a first overexposed proportion and/or a first underexposed proportion.

Optionally, the determining, by the determining unit 40, a corresponding exposure brightness adjustment multiple group according to the first exposure proportion is specifically: determining a brightness value of the preview image; decreasing the brightness value when determining that the first overexposed proportion reaches a first overexposed proportion threshold and the first underexposed proportion does not reach a first underexposed proportion threshold; determining a second overexposed proportion and a second underexposed proportion of the preview image, and a first variation of the brightness value after the brightness value is decreased, when determining that a first pre-set condition is satisfied after the brightness value is decreased; and determining an exposure brightness adjustment multiple group corresponding to the second overexposed proportion when determining that the second overexposed proportion reaches a second overexposed proportion threshold and the second underexposed proportion does not reach a third underexposed proportion threshold.

Optionally, the determining, by the determining unit 40, a corresponding exposure brightness adjustment multiple group according to the first exposure proportion is specifically: determining a brightness value of the preview image; decreasing the brightness value when determining that the first overexposed proportion reaches a first overexposed proportion threshold and the first underexposed proportion does not reach a first underexposed proportion threshold; determining a second overexposed proportion and a second underexposed proportion of the preview image, and a first variation of the brightness value after the brightness value is decreased, when determining that a first pre-set condition is satisfied after the brightness value is decreased; and determining an exposure brightness adjustment multiple group corresponding to the second underexposed proportion when determining that the second underexposed proportion reaches a third underexposed proportion threshold and the second overexposed proportion does not reach a second overexposed proportion threshold.

Optionally, the determining, by the determining unit 40, a corresponding exposure brightness adjustment multiple group according to the first exposure proportion is specifically: determining a brightness value of the preview image; decreasing the brightness value when determining that the first overexposed proportion reaches a first overexposed proportion threshold and the first underexposed proportion does not reach a first underexposed proportion threshold; determining a second overexposed proportion and a second underexposed proportion of the preview image, and a first variation of the brightness value after the brightness value is decreased, when determining that a first pre-set condition is satisfied after the brightness value is decreased; and determining an exposure brightness adjustment multiple group corresponding to the second underexposed proportion and the second overexposed proportion when determining that the second underexposed proportion reaches a third underexposed proportion threshold and the second overexposed proportion reaches a second overexposed proportion threshold.

Optionally, the adjusting, by the adjustment unit 41, the first type of the exposure brightness adjustment multiple and the third type of the exposure brightness adjustment multiple according to the first exposure proportion is specifically: adjusting the first type of the exposure brightness adjustment multiple according to the first underexposed proportion, the second underexposed proportion, and the first variation; and adjusting the third type of the exposure brightness adjustment multiple according to the first overexposed proportion and the second overexposed proportion.

Optionally, the first pre-set condition is that: the first variation reaches a first variation threshold, and/or the second underexposed proportion reaches the first underexposed proportion threshold.

Further, the determining unit 40 is further configured to return to a step of determining that the second overexposed proportion reaches the first overexposed proportion threshold until the first pre-set condition is satisfied, when determining that the first pre-set condition is not satisfied after the brightness value is decreased, where the step includes the following operation: decreasing, by the user equipment, the brightness value when determining that a current overexposed proportion after the brightness value is decreased reaches the first overexposed proportion threshold and a current underexposed proportion after the brightness value is decreased does not reach the first underexposed proportion threshold.

Further, before the determining, by the determining unit 40, a second overexposed proportion, a second underexposed proportion, and a first variation after determining that a first pre-set condition is satisfied after the brightness value is decreased, the user equipment further includes: determining that the second overexposed proportion reaches the second overexposed proportion threshold; or determining that the second underexposed proportion reaches the third underexposed proportion threshold.

Optionally, the determining, by the determining unit 40, a corresponding exposure brightness adjustment multiple group according to the first exposure proportion is specifically: determining a brightness value; increasing the brightness value when determining that the first underexposed proportion reaches a second underexposed proportion threshold and the first overexposed proportion does not reach a third overexposed proportion threshold; determining a third overexposed proportion, a third underexposed proportion, and a second variation of the brightness value after the brightness value is increased, when determining that a second pre-set condition is satisfied after the brightness value is increased; and determining an exposure brightness adjustment multiple group corresponding to the third overexposed proportion when determining that the third overexposed proportion reaches a second overexposed proportion threshold and the third underexposed proportion does not reach a third underexposed proportion threshold.

Optionally, the determining, by the determining unit 40, a corresponding exposure brightness adjustment multiple group according to the first exposure proportion is specifically: determining a brightness value; increasing the brightness value when determining that the first underexposed proportion reaches a second underexposed proportion threshold and the first overexposed proportion does not reach a third overexposed proportion threshold; determining a third overexposed proportion, a third underexposed proportion, and a second variation of the brightness value after the brightness value is increased, when determining that a second pre-set condition is satisfied after the brightness value is increased; and determining an exposure brightness adjustment multiple group corresponding to the third underexposed proportion when determining that the third underexposed proportion reaches a third underexposed proportion threshold and the third overexposed proportion does not reach a second overexposed proportion threshold.

Optionally, the determining, by the determining unit 40, a corresponding exposure brightness adjustment multiple group according to the first exposure proportion is specifically: determining a brightness value; increasing the brightness value when determining that the first underexposed proportion reaches a second underexposed proportion threshold and the first overexposed proportion does not reach a third overexposed proportion threshold; determining a third overexposed proportion, a third underexposed proportion, and a second variation of the brightness value after the brightness value is increased, when determining that a second pre-set condition is satisfied after the brightness value is increased; and determining an exposure brightness adjustment multiple group corresponding to the third overexposed proportion and the third underexposed proportion when determining that the third underexposed proportion reaches a third underexposed proportion threshold and the third overexposed proportion reaches a second overexposed proportion threshold.

Optionally, the adjusting, by the determining unit 40, the first type of the exposure brightness adjustment multiple and the third type of the exposure brightness adjustment multiple according to the first exposure proportion is specifically: adjusting the first type of the exposure brightness adjustment multiple according to the first underexposed proportion and the third underexposed proportion; and adjusting the third type of the exposure brightness adjustment multiple according to the first overexposed proportion, the third overexposed proportion, and the second variation.

Optionally, the second pre-set condition is that: the second variation reaches a second variation threshold and/or the third overexposed proportion reaches the third overexposed proportion threshold.

Further, the determining unit 40 is further configured to return to a step of determining that the third underexposed proportion reaches the second underexposed proportion threshold until the second pre-set condition is satisfied, when determining that the second pre-set condition is not satisfied after the brightness value is increased, where the step includes the following operation: increasing, by the user equipment, the brightness value when determining that a current underexposed proportion after the brightness value is increased reaches the second underexposed proportion threshold and a current overexposed proportion after the brightness value is increased does not reach the third overexposed proportion threshold.

Further, before determining, by the determining unit 40, a third overexposed proportion, a third underexposed proportion, and a second variation after determining that a second pre-set condition is satisfied, the user equipment further includes: determining that the third underexposed proportion reaches the third underexposed proportion threshold; or determining that the third overexposed proportion reaches the second overexposed proportion threshold.

Optionally, the adjusting, by the determining unit 40, the third type of the exposure brightness adjustment multiple according to the first exposure proportion is specifically: determining a brightness value of the preview image; decreasing the brightness value, and calculating a third variation of the brightness value when determining that the first overexposed proportion reaches a second overexposed proportion threshold; determining a fourth overexposed proportion after the brightness value of the preview image is decreased; and adjusting the third type of the exposure brightness adjustment multiple according to the third variation when determining that the fourth overexposed proportion does not reach a fourth overexposed proportion threshold.

Optionally, the adjusting, by the adjustment unit 41, the first type of the exposure brightness adjustment multiple according to the first exposure proportion is specifically determining a brightness value of the preview image; increasing the brightness value, and calculating a fourth variation of the brightness value when determining that the first underexposed proportion reaches a third underexposed proportion threshold; determining a fourth underexposed proportion of the preview image after the brightness value is increased; and adjusting the first type of the exposure brightness adjustment multiple according to the fourth variation when determining that the fourth underexposed proportion does not reach a fourth underexposed proportion threshold.

Further, the determining unit 40 is further configured to: determine a second exposure proportion of a ROI of the preview image and a weight value of the ROI; an calculate a third exposure proportion according to the second exposure proportion and the weight value; and the adjustment unit 41 is further configured to adjust the adjusted first type of the exposure brightness adjustment multiple and the adjusted third type of the exposure brightness adjustment multiple again according to the third exposure proportion.

Further, the determining unit 40 is further configured to: increase the brightness value of the preview image, and determine a fifth variation after the brightness value is increased; and determine a fourth exposure proportion before the brightness value of the preview image is increased; and the determining, by a determining unit 40, a first exposure proportion of a current preview image of a to-be-captured area is specifically: determining the first exposure proportion after the brightness value of the current preview image is increased.

Optionally, the adjusting, by the adjustment unit 41, the first type of the exposure brightness adjustment multiple and the third type of the exposure brightness adjustment multiple according to the first exposure proportion is specifically: adjusting the first type of the exposure brightness adjustment multiple and the third type of the exposure brightness adjustment multiple according to the first exposure proportion, the fourth exposure proportion, and the fifth variation.

Optionally, the first exposure proportion includes the first overexposed proportion and/or the first underexposed proportion, and the fourth exposure proportion includes a fifth overexposed proportion and/or a fifth underexposed proportion; and the adjusting, by the adjustment unit 41, the first type of the exposure brightness adjustment multiple and the third type of the exposure brightness adjustment multiple according to the first exposure proportion, the fourth exposure proportion, and the fifth variation is specifically: adjusting the first type of the exposure brightness adjustment multiple according to the first underexposed proportion and the fifth underexposed proportion; and adjusting the third type of the exposure brightness adjustment multiple according to the first overexposed proportion, the fifth overexposed proportion, and the fifth variation.

Further, the determining unit 40 is further configured to: decrease the brightness value of the preview image, and determine a sixth variation after the brightness value is decreased; and determine a fifth exposure proportion before the brightness value of the preview image is decreased; and the determining, by a determining unit 40, a first exposure proportion of a current preview image of a to-be-captured area is specifically: determining the first exposure proportion after the brightness value of the current preview image is decreased.

Optionally, the adjusting, by the adjustment unit 41, the first type of the exposure brightness adjustment multiple and the third type of the exposure brightness adjustment multiple according to the first exposure proportion is specifically: adjusting the first type of the exposure brightness adjustment multiple and the third type of the exposure brightness adjustment multiple according to the first exposure proportion, the fifth exposure proportion, and the sixth variation.

Optionally, the first exposure proportion includes the first overexposed proportion and/or the first underexposed proportion, and the fifth exposure proportion includes a sixth overexposed proportion and/or a sixth underexposed proportion; and the adjusting, by the adjustment unit 41, the first type of the exposure brightness adjustment multiple and the third type of the exposure brightness adjustment multiple according to the first exposure proportion, the fifth exposure proportion, and the sixth variation is specifically adjusting the first type of the exposure brightness adjustment multiple according to the first underexposed proportion, the sixth underexposed proportion, and the sixth variation; and adjusting the third type of the exposure brightness adjustment multiple according to the first overexposed proportion and the sixth overexposed proportion.

Optionally, the compositing, by a generation unit 43, a target image according to the first group of images, the second group of images, and the third group of images is specifically: increasing a composite weight of a target area of the second group of images; and compositing the target image according to the first group of images, the second group of images, an increased composite weight of the second group of images, and the third group of images.

Figure 4B:
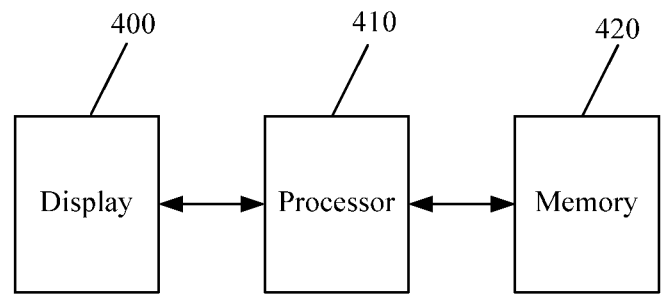
FIG. 4B is another schematic diagram of user equipment according to an embodiment of the present invention.

Referring to FIG. 4B, in this embodiment of the present invention, a portable electronic device is further provided, including: a display 400, where the display 400 includes a touch-sensitive surface and a display screen; one or more processors 410; a memory 420; and one or more programs, where the one or more programs are stored in the memory 420, and are configured to be executed by the one or more processors 410, and the one or more programs include instructions used to perform the method according to steps 100 to 140.

In this embodiment of the present invention, a computer readable storage medium storing one or more programs is further provided, where the one or more programs include instructions, and when the instructions are executed by a portable electronic device including a display and multiple application programs, the portable electronic device performs the method according to steps 100 to 140, where the display includes a touch-sensitive surface and a display screen.

Figure 5A:
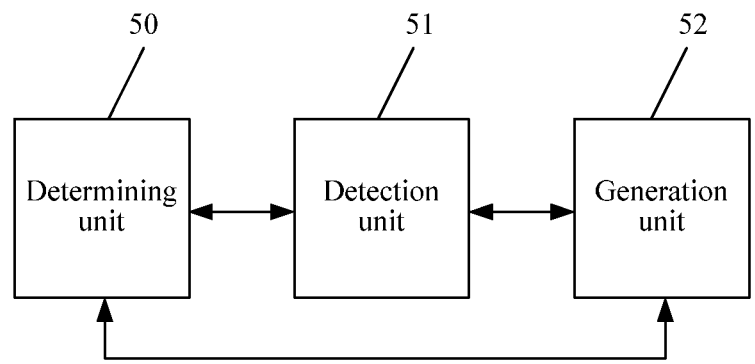
FIG. 5A is another schematic diagram of user equipment according to an embodiment of the present invention.

Referring to FIG. 5A, in this embodiment of the present invention, user equipment is provided, including: a determining unit 50, a detection unit 51, and a generation unit 52.

The determining unit 50 is configured to determine that there is a moving object.

The detection unit 51 is configured to: when the determining unit 50 determines that there is a moving object, detect a motion intensity of the moving object.

The determining unit 50 is further configured to determine that the motion intensity is greater than a motion intensity threshold.

The generation unit 52 is configured to: when the determining unit 50 determines that the motion intensity is greater than the motion intensity threshold, use an image whose exposure brightness adjustment multiple is 0 as a target image.

Further, the determining unit 50 is further configured to determine that there is no moving object.

The generation unit 52 is further configured to: when the determining unit 50 determines that there is no moving object, composite the target image by using a long exposure time.

The determining unit 50 is further configured to determine that the motion intensity is less than or equal to the motion intensity threshold.

The generation unit 52 is further configured to: when the determining unit 50 determines that the motion intensity is less than or equal to the motion intensity threshold, composite the target image by using a short exposure time.

Optionally, the determining, by the determining unit 50, that there is a moving object is specifically: determining that the user equipment is in a moving state, and/or that there is an object in a moving state in a to-be-captured area.

Figure 5B:
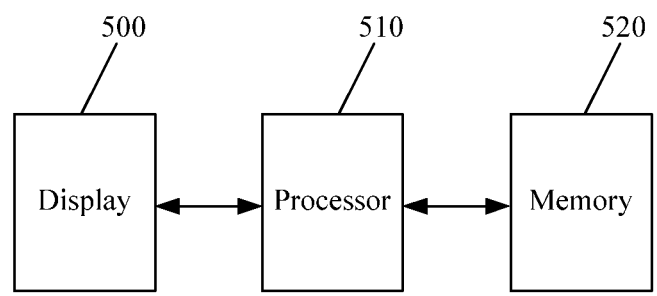
FIG. 5B is another schematic diagram of user equipment according to an embodiment of the present invention.

Referring to FIG. 5B, in this embodiment of the present invention, a portable electronic device is further provided, including: a display 500, where the display 500 includes a touch-sensitive surface and a display screen; one or more processors 510; a memory 520; and one or more programs, where the one or more programs are stored in the memory 520 and are configured to be executed by the one or more processors 510, and the one or more programs include instructions used to perform the method according to steps 200 to 210.

In this embodiment of the present invention, a computer readable storage medium storing one or more programs is further provided, where the one or more programs include instructions, and when the instructions are executed by a portable electronic device including a display and multiple application programs, the portable electronic device performs the method according to steps 200 to 210, where the display includes a touch-sensitive surface and a display screen.

Figure 6A:
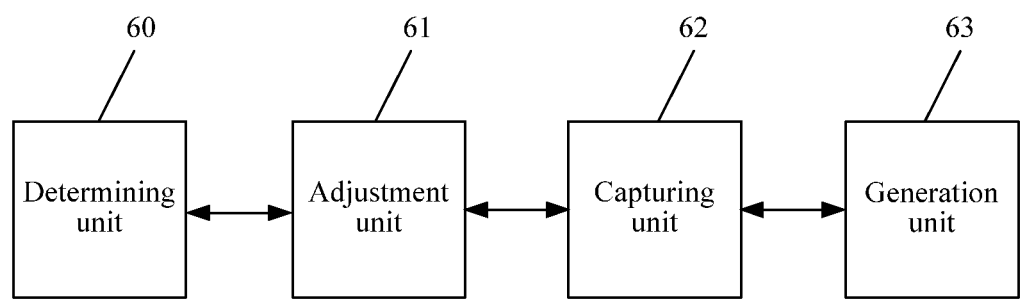
FIG. 6A is another schematic diagram of user equipment according to an embodiment of the present invention.

Referring to FIG. 6A, in this embodiment of the present invention, user equipment is provided, including: a determining unit 60, an adjustment unit 61, a capturing unit 62, and a generation unit 63.

The determining unit 60 is configured to: when determining that banding exists in a current preview image of a to-be-captured area, determine an intensity of the banding.

The adjustment unit 61 is configured to increase a first type of an exposure brightness adjustment multiple and a second type of an exposure brightness adjustment multiple when determining that the intensity of the banding is greater than an intensity threshold, where the first type of the exposure brightness adjustment multiple is used to indicate that exposure brightness remains unchanged after the exposure brightness is adjusted by using the exposure brightness adjustment multiple, and the second type of the exposure brightness adjustment multiple is used to indicate that exposure brightness is decreased after the exposure brightness is adjusted by using the exposure brightness adjustment multiple.

The capturing unit 62 is configured to capture a first group of images of the to-be-captured area according to an adjusted first type of the exposure brightness adjustment multiple, a second group of images of the to-be-captured area according to an adjusted second type of the exposure brightness adjustment multiple, and a third group of images of the to-be-captured area according to a third type of an exposure brightness adjustment multiple, where the second type of the exposure brightness adjustment multiple is used to indicate that exposure brightness is increased after the exposure brightness is adjusted by using the exposure brightness adjustment multiple.

The generation unit 63 is configured to composite a target image according to the first group of images, the second group of images, and the third group of images.

Further, the adjustment unit 61 is further configured to adjust the third type of the exposure brightness adjustment multiple.

The capturing, by the capturing unit 62, a third group of images of the to-be-captured area according to a third type of an exposure brightness adjustment multiple is specifically: capturing the third group of images of the to-be-captured area according to an adjusted third type of the exposure brightness adjustment multiple.

Further, the adjustment unit 61 is further configured to: when determining that the intensity of the banding is less than or equal to the intensity threshold, increase the second type of the exposure brightness adjustment multiple, and/or decrease a weight value of the second group of images.

Figure 6B:
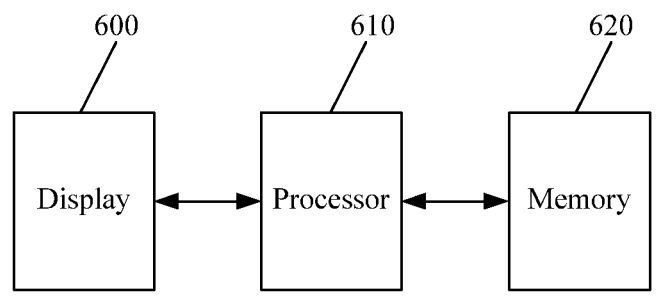
FIG. 6B is another schematic diagram of user equipment according to an embodiment of the present invention.

Referring to FIG. 6B, in this embodiment of the present invention, a portable electronic device is further provided, including: a display 600, where the display 600 includes a touch-sensitive surface and a display screen; one or more processors 610; a memory 620; and one or more programs, where the one or more programs are stored in the memory 620 and are configured to be executed by the one or more processors 610, and the one or more programs include instructions used to perform the method according to steps 300 to 330.

In this embodiment of the present invention, a computer readable storage medium storing one or more programs is further provided, where the one or more programs include instructions, and when the instructions are executed by a portable electronic device including a display and multiple application programs, the portable electronic device performs the method according to steps 300 to 330, where the display includes a touch-sensitive surface and a display screen.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a compact disk read only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artefact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:
1. A method comprising:
   determining, by a user equipment, a first exposure proportion of a preview image of a to-be-captured area;
   determining, by the user equipment, a corresponding exposure brightness adjustment multiple group according to the first exposure proportion, wherein the exposure brightness adjustment multiple group comprises a first type of an exposure brightness adjustment multiple indicating that exposure brightness is increased after the exposure brightness is adjusted using the exposure brightness adjustment multiple, a second type of an exposure brightness adjustment multiple indicating that exposure brightness remains unchanged after the exposure brightness is adjusted using the exposure brightness adjustment multiple, and a third type of an exposure brightness adjustment multiple indicating that exposure brightness is decreased after the exposure brightness is adjusted using the exposure brightness adjustment multiple;

adjusting, by the user equipment, the first type of the exposure brightness adjustment multiple and adjusting the third type of the exposure brightness adjustment multiple according to the first exposure proportion;

capturing, by the user equipment, a first group of images of the to-be-captured area using an adjusted first type of the exposure brightness adjustment multiple, capturing a second group of images of the to-be-captured area using the second type of the exposure brightness adjustment multiple, and capturing a third group of images of the to-be-captured area using an adjusted third type of the exposure brightness adjustment multiple; and compositing, by the user equipment, a target image according to the first group of images, according to the second group of images, and according to the third group of images.

2. The method according to claim 1, wherein the first exposure proportion comprises a first overexposed proportion or a first underexposed proportion.

3. The method according to claim 2, wherein determining, the corresponding exposure brightness adjustment multiple group comprises:

determining, by the user equipment, a brightness value of the preview image;

decreasing, by the user equipment, the brightness value, in response to determining that the first overexposed proportion reaches a first overexposed proportion threshold and that the first underexposed proportion does not reach a first underexposed proportion threshold;

determining, by the user equipment, a second overexposed proportion and a second underexposed proportion of the preview image, and determining a first variation of the brightness value after the brightness value is decreased, in response to determining that a first pre-set condition is satisfied after the brightness value is decreased; and determining, by the user equipment, an exposure brightness adjustment multiple group corresponding to the second overexposed proportion, in response to determining that the second overexposed proportion reaches a second overexposed proportion threshold and that the second underexposed proportion does not reach a third underexposed proportion threshold.

4. The method according to claim 3, adjusting=the first type of the exposure brightness adjustment multiple and adjusting the third type of the exposure brightness adjustment multiple comprises:

adjusting, by the user equipment, the first type of the exposure brightness adjustment multiple according to the first underexposed proportion, according to the second underexposed proportion, and according to the first variation; and adjusting, by the user equipment, the third type of the exposure brightness adjustment multiple according to the first overexposed proportion and according to the second overexposed proportion.

5. The method according to claim 3, wherein the first pre-set condition is that the first variation reaches a first variation threshold, or that the second underexposed proportion reaches the first underexposed proportion threshold.

6. The method according to claim 3, wherein the method further comprises:

performing again, by the user equipment, a step of determining that the second overexposed proportion reaches the first overexposed proportion threshold until the first pre-set condition is satisfied, in response to determining that the first pre-set condition is not satisfied, after the brightness value is decreased, wherein the step of determining that the second overexposed proportion reaches the first overexposed proportion threshold comprises:

decreasing, by the user equipment, the brightness value, in response to determining that a current overexposed proportion after the brightness value is decreased reaches the first overexposed proportion threshold and that a current underexposed proportion after the brightness value is decreased does not reach the first underexposed proportion threshold.

7. The method according to claim 3, wherein the method further comprises:

determining, by the user equipment, that the second overexposed proportion reaches the second overexposed proportion threshold, before determining the second overexposed proportion, the second underexposed proportion, and a first variation, and after determining that the first pre-set condition is satisfied, after the brightness value is decreased; or determining, by the user equipment, that the second underexposed proportion reaches the third underexposed proportion threshold, before determining the second overexposed proportion, the second underexposed proportion, and the first variation, and after determining that the first pre-set condition is satisfied, after the brightness value is decreased.

8. The method according to claim 2, wherein determining the corresponding exposure brightness adjustment multiple group comprises:

determining, by the user equipment, a brightness value of the preview image;

decreasing, by the user equipment, the brightness value, in response to determining that the first overexposed proportion reaches a first overexposed proportion threshold and that the first underexposed proportion does not reach a first underexposed proportion threshold;

determining, by the user equipment, a second overexposed proportion and determining a second underexposed proportion of the preview image, and determining a first variation of the brightness value, after the brightness value is decreased, in response to determining that a first pre-set condition is satisfied, after the brightness value is decreased; and determining, by the user equipment, an exposure brightness adjustment multiple group corresponding to the second underexposed proportion, in response to determining that the second underexposed proportion reaches a third underexposed proportion threshold and that the second overexposed proportion does not reach a second overexposed proportion threshold.

9. The method according to claim 2, wherein determining the corresponding exposure brightness adjustment multiple group according to the first exposure proportion comprises:

determining, by the user equipment, a brightness value of the preview image;

decreasing, by the user equipment, the brightness value, in response to determining that the first overexposed proportion reaches a first overexposed proportion threshold and that the first underexposed proportion does not reach a first underexposed proportion threshold;

determining, by the user equipment, a second overexposed proportion and determining a second underexposed proportion of the preview image, and determining a first variation of the brightness value, after the brightness value is decreased, in response to determining that a first pre-set condition is satisfied, after the brightness value is decreased; and determining, by the user equipment, an exposure brightness adjustment multiple group corresponding to the second underexposed proportion and according to the second overexposed proportion, in response to determining that the second underexposed proportion reaches a third underexposed proportion threshold and that the second overexposed proportion reaches a second overexposed proportion threshold.

10. The method according to claim 2, wherein determining the corresponding exposure brightness adjustment multiple group comprises:
   determining, by the user equipment, a brightness value;
   increasing, by the user equipment, the brightness value, in response to determining that the first underexposed proportion reaches a second underexposed proportion threshold and that the first overexposed proportion does not reach a third overexposed proportion threshold;
   determining, by the user equipment, a third overexposed proportion, determining a third underexposed proportion, and determining a second variation of the brightness value, after the brightness value is increased, in response to determining that a second pre-set condition is satisfied, after the brightness value is increased; and
   determining, by the user equipment, an exposure brightness adjustment multiple group corresponding to the third underexposed proportion, in response to determining that the third underexposed proportion reaches a third underexposed proportion threshold, and that the third overexposed proportion does not reach a second overexposed proportion threshold.

11. The method according to claim 10, wherein adjusting the first type of the exposure brightness adjustment multiple and the third type of the exposure brightness adjustment multiple comprises:
   adjusting, by the user equipment, the first type of the exposure brightness adjustment multiple according to the first underexposed proportion and according to the third underexposed proportion; and
   adjusting, by the user equipment, the third type of the exposure brightness adjustment multiple according to the first overexposed proportion, according to the third overexposed proportion, and according to the second variation.

12. The method according to claim 10, wherein the second pre-set condition is that:
   the second variation reaches a second variation threshold or that the third overexposed proportion reaches the third overexposed proportion threshold.

13. The method according to claim 10, wherein the method further comprises:
   performing again, by the user equipment, a step of determining that the third underexposed proportion reaches the second underexposed proportion threshold until the second pre-set condition is satisfied, in response to determining that the second pre-set condition is not satisfied after the brightness value is increased, wherein the step of determining that the third underexposed proportion reaches the second underexposed proportion threshold comprises:
   increasing, by the user equipment, the brightness value, in response to determining that a current underexposed proportion, after the brightness value is increased, reaches the second underexposed proportion threshold and that a current overexposed proportion after the brightness value is increased does not reach the third overexposed proportion threshold.

14. The method according to claim 10, wherein the method further comprises:
   determining, by the user equipment, that the third underexposed proportion reaches the third underexposed proportion threshold, before determining the third overexposed proportion, determining the third underexposed proportion, and determining the second variation, and after determining that the second pre-set condition is satisfied; or
   determining, by the user equipment, that the third overexposed proportion reaches the second overexposed proportion threshold, before determining the third overexposed proportion, determining the third underexposed proportion, and determining the second variation, and after determining that the second pre-set condition is satisfied.

15. The method according to claim 2, wherein determining the corresponding exposure brightness adjustment multiple group comprises:
   determining, by the user equipment, a brightness value;
   increasing, by the user equipment, the brightness value, in response to determining that the first underexposed proportion reaches a second underexposed proportion threshold and that the first overexposed proportion does not reach a third overexposed proportion threshold;
   determining, by the user equipment, a third overexposed proportion, determining a third underexposed proportion, and determining a second variation of the brightness value, after the brightness value is increased, in response to determining that a second pre-set condition is satisfied after the brightness value is increased; and
   determining, by the user equipment, an exposure brightness adjustment multiple group corresponding to the third overexposed proportion, in response to determining that the third underexposed proportion reaches a third underexposed proportion threshold and that the third overexposed proportion reaches a second overexposed proportion threshold.

16. The method according to claim 2, wherein determining, the corresponding exposure brightness adjustment multiple group comprises:
   determining, by the user equipment, a brightness value;
   increasing, by the user equipment, the brightness value, in response to determining that the first underexposed proportion reaches a second underexposed proportion threshold and that the first overexposed proportion does not reach a third overexposed proportion threshold;
   determining, by the user equipment, a third overexposed proportion, determining a third underexposed proportion, and determining a second variation of the brightness value, after the brightness value is increased, in response to determining that a second pre-set condition is satisfied after the brightness value is increased; and
   determining, by the user equipment, an exposure brightness adjustment multiple group corresponding to the third overexposed proportion and corresponding to the third underexposed proportion, in response to determining that the third overexposed proportion reaches a second overexposed proportion threshold and that the third underexposed proportion does not reach a third underexposed proportion threshold.

17. The method according to claim 2, wherein adjusting the third type of the exposure brightness adjustment multiple comprises:
   determining, by the user equipment, a brightness value of the preview image;
   decreasing, by the user equipment, the brightness value, and calculating a third variation of the brightness value, in response to determining that the first overexposed proportion reaches a second overexposed proportion threshold;
   determining, by the user equipment, a fourth overexposed proportion after the brightness value of the preview image is decreased; and
   adjusting, by the user equipment, the third type of the exposure brightness adjustment multiple according to the third variation, in response to determining that the fourth overexposed proportion does not reach a fourth overexposed proportion threshold.

18. The method according to claim 2, wherein adjusting the first type of the exposure brightness adjustment multiple comprises:
   determining, by the user equipment, a brightness value of the preview image;
   increasing, by the user equipment, the brightness value, and calculating a fourth variation of the brightness value, in response to determining that the first underexposed proportion reaches a third underexposed proportion threshold;
   determining, by the user equipment, a fourth underexposed proportion threshold of the preview image after the brightness value is increased; and
   adjusting, by the user equipment, the first type of the exposure brightness adjustment multiple according to the fourth variation, in response to determining that a fourth underexposed proportion does not reach the fourth underexposed proportion threshold.

19. The method according to claim 2, wherein the method further comprises:
   determining, by the user equipment, a second exposure proportion of a region of interest (ROI) of the preview image and a weight value of the ROI, after adjusting the first type of the exposure brightness adjustment multiple and adjusting the third type of the exposure brightness adjustment multiple, and before capturing a first group of images, a second group of images, and a third group of images;
   calculating, by the user equipment, a third exposure proportion according to the second exposure proportion and the weight value; and
   adjusting, by the user equipment, the adjusted first type of the exposure brightness adjustment multiple, and adjusting the adjusted third type of the exposure brightness adjustment multiple again according to the third exposure proportion.

20. The method according to claim 1, wherein the method further comprises:
   increasing, by the user equipment, a brightness value of the preview image, and determining a fifth variation, after the brightness value is increased, and before determine the first exposure proportion of a current preview image of a to-be-captured area; and
   determining, by the user equipment, a fourth exposure proportion, before the brightness value of the preview image is increased, wherein; and
   wherein determining the first exposure proportion of the current preview image of the to-be-captured area comprises:
      determining, by the user equipment, the first exposure proportion, after the brightness value of the current preview image is increased.

* * * * *